United States Patent
Lee et al.

(10) Patent No.: US 10,602,538 B2
(45) Date of Patent: Mar. 24, 2020

(54) METHOD FOR TRANSMITTING AND RECEIVING SIGNAL IN WIRELESS COMMUNICATION SYSTEM AND DEVICE FOR PERFORMING SAME

(71) Applicant: LG Electronics Inc., Seoul (KR)

(72) Inventors: Seungmin Lee, Seoul (KR); Joonkui Ahn, Seoul (KR); Suckchel Yang, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/512,632

(22) PCT Filed: Sep. 25, 2015

(86) PCT No.: PCT/KR2015/010227
§ 371 (c)(1),
(2) Date: Mar. 20, 2017

(87) PCT Pub. No.: WO2016/048100
PCT Pub. Date: Mar. 31, 2016

(65) Prior Publication Data
US 2017/0303306 A1    Oct. 19, 2017

Related U.S. Application Data

(60) Provisional application No. 62/056,480, filed on Sep. 27, 2014.

(51) Int. Cl.
*H04W 72/14* (2009.01)
*H04L 1/18* (2006.01)
(Continued)

(52) U.S. Cl.
CPC ........... *H04W 72/14* (2013.01); *H04L 1/0038* (2013.01); *H04L 1/1812* (2013.01);
(Continued)

(58) Field of Classification Search
None
See application file for complete search history.

(56) References Cited

U.S. PATENT DOCUMENTS

| | | | |
|---|---|---|---|
| 2013/0163543 | A1 | 6/2013 | Freda et al. |
| 2013/0315114 | A1 | 11/2013 | Seo et al. |

(Continued)

FOREIGN PATENT DOCUMENTS

| | | | |
|---|---|---|---|
| CN | 103037524 A | 4/2013 |
| CN | 103444119 A | 12/2013 |

(Continued)

OTHER PUBLICATIONS

R1-142197: 3GPP TSG RAN WG1 Meeting #77, Seoul, South Korea, May 19-23, 2014, Sharp, "DL Harq-Ack in TDD-FDD CA with eIMTA," pp. 1-3.
(Continued)

*Primary Examiner* — Anh Ngoc M Nguyen
(74) *Attorney, Agent, or Firm* — Dentons US LLP

(57) ABSTRACT

A method for receiving a signal by a terminal, having a plurality of cells configured, in a wireless communication system according to an embodiment of the present invention comprises the steps of: assuming a first uplink subframe of a first cell, having a time division duplex (TDD) frame structure among a plurality of cells, to be a downlink subframe on the basis of a predetermined condition and blind-decoding same; and, if a downlink grant with respect to a second cell, located in an unlicensed band among the plurality of cells, is detected by means of the blind-decoding, receiving downlink data through the second cell, wherein the first uplink subframe is indicated as an uplink subframe by means of a first uplink-downlink subframe configuration in an enhanced interface mitigation and traffic adaptation (eIMTA) fallback comprised in a system information block type 1 (SIB 1) and at the same time is indicated (Continued)

as a downlink subframe by means of downlink hybrid automatic repeat request (HARQ) reference configuration in the eIMTA fallback.

10 Claims, 16 Drawing Sheets

(51) Int. Cl.
| | |
|---|---|
| *H04L 5/00* | (2006.01) |
| *H04W 88/06* | (2009.01) |
| *H04L 1/00* | (2006.01) |
| *H04L 5/14* | (2006.01) |
| *H04W 72/04* | (2009.01) |
| *H04W 72/12* | (2009.01) |
| *H04W 74/08* | (2009.01) |
| *H04L 1/16* | (2006.01) |
| *H04W 76/15* | (2018.01) |
| *H04W 16/14* | (2009.01) |

(52) U.S. Cl.
CPC .......... *H04L 1/1822* (2013.01); *H04L 1/1854* (2013.01); *H04L 5/0053* (2013.01); *H04L 5/0087* (2013.01); *H04L 5/0096* (2013.01); *H04L 5/1469* (2013.01); *H04W 72/0446* (2013.01); *H04W 72/1278* (2013.01); *H04W 74/0808* (2013.01); *H04W 88/06* (2013.01); *H04L 1/0073* (2013.01); *H04L 1/1671* (2013.01); *H04L 1/1864* (2013.01); *H04L 5/001* (2013.01); *H04L 5/0055* (2013.01); *H04L 5/0057* (2013.01); *H04W 16/14* (2013.01); *H04W 76/15* (2018.02)

(56) References Cited

U.S. PATENT DOCUMENTS

| | | | |
|---|---|---|---|
| 2013/0322343 | A1 | 12/2013 | Seo et al. |
| 2014/0036742 | A1* | 2/2014 | Charbit ............. H04W 52/0235 370/280 |
| 2014/0036853 | A1 | 2/2014 | Kim et al. |
| 2014/0112289 | A1 | 4/2014 | Kim et al. |
| 2014/0161002 | A1 | 6/2014 | Gauvreau et al. |
| 2015/0264678 | A1* | 9/2015 | Yin ........................ H04W 52/22 370/329 |
| 2016/0007360 | A1* | 1/2016 | Nguyen ................ H04L 5/0053 370/280 |
| 2016/0192354 | A1* | 6/2016 | Wei ........................ H04L 1/1812 370/329 |
| 2016/0242188 | A1* | 8/2016 | Tiirola .................. H04W 24/10 |
| 2017/0134144 | A1* | 5/2017 | Lunttila ................ H04L 1/1887 |
| 2017/0135073 | A1* | 5/2017 | Tiirola ................. H04W 72/042 |

FOREIGN PATENT DOCUMENTS

| | | |
|---|---|---|
| CN | 103563284 A | 2/2014 |
| CN | 103974144 A | 7/2014 |
| EP | 3110064 A1 | 12/2016 |

OTHER PUBLICATIONS

RP-140724:3GPP TSG RAN meeting #64, Sophia Antipolis, France, Jun. 10-13, 2014, "Further Enhancements to LTE TDD for DL-UL Interference Management and Traffic Adaption," Status Report to TSG, CATT, pp. 1-11.

R1-143164: 3GPP TSG RAN WG1 Meeting #78, Dresden, Germany, Aug. 18-22, 2014, "Correction on ModeA-uplink/downlink determination for a UE configured with TDD eIMTA," LG Electronics, pp. 1-3.

* cited by examiner

FIG. 2
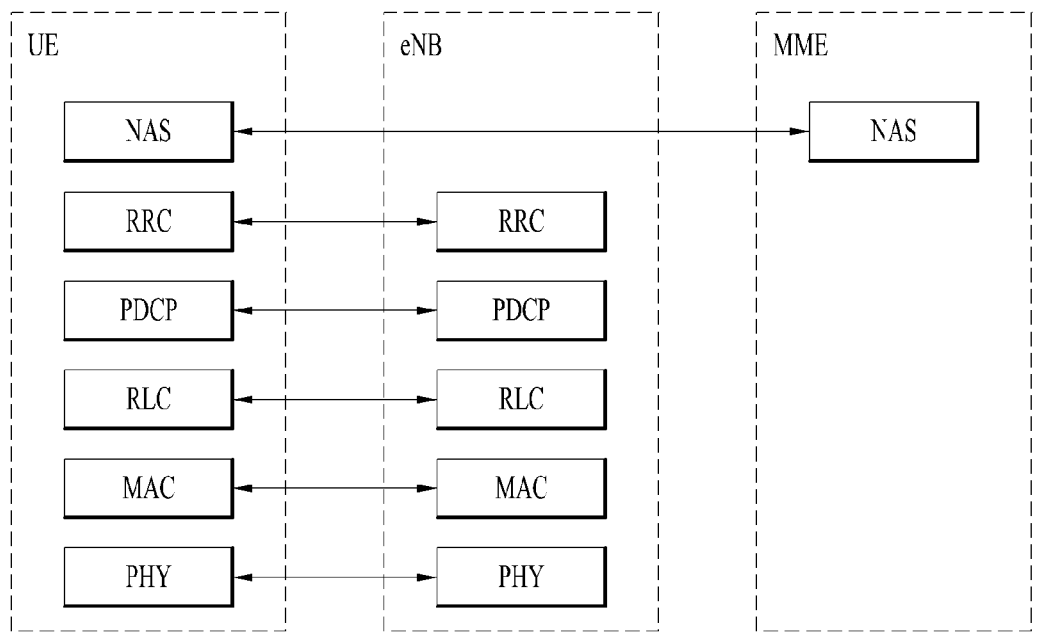
(a) Control-Plane Protocol Stack
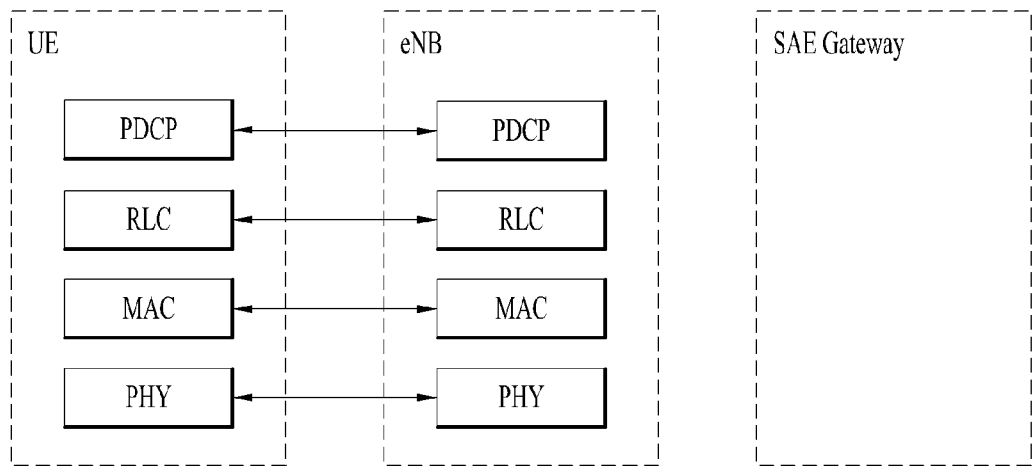
(b) User-Plane Protocol Stack

FIG. 8
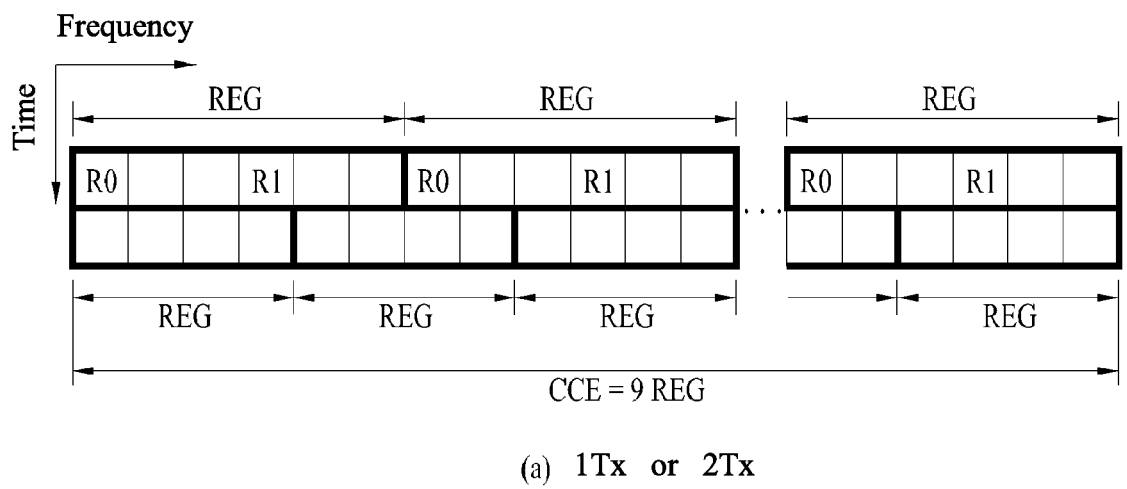
(a) 1Tx or 2Tx
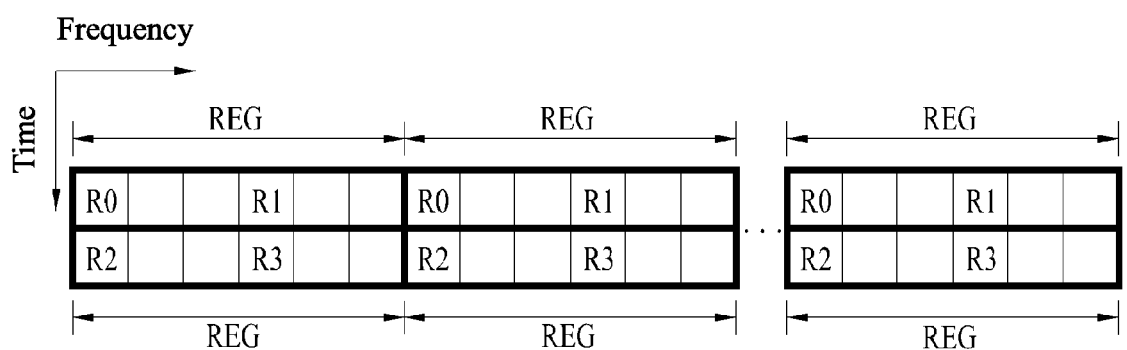
(b) 4 TX

FIG. 16

*PUSCH-Config* information element

```
PUSCH-ConfigCommon ::=              SEQUENCE {
    pusch-ConfigBasic                   SEQUENCE {
        n-SB                                INTEGER (1..4),
        hoppingMode                             ENUMERATED {interSubFrame, intraAndInterSubFrame},
        pusch-HoppingOffset                 INTEGER (0..98),
        enable64QAM                         BOOLEAN
    },
    ul-ReferenceSignalsPUSCH            UL-ReferenceSignalsPUSCH
}

PUSCH-ConfigDedicated ::=           SEQUENCE {
    betaOffset-ACK-Index                INTEGER (0..15),
    betaOffset-RI-Index                 INTEGER (0..15),
    betaOffset-CQI-Index                INTEGER (0..15)
}

PUSCH-ConfigDedicated-v1020 ::=     SEQUENCE {
    betaOffsetMC-r10                    SEQUENCE {
        betaOffset-ACK-Index-MC-r10         INTEGER (0..15),
        betaOffset-RI-Index-MC-r10          INTEGER (0..15),
        betaOffset-CQI-Index-MC-r10         INTEGER (0..15)
    }                                                                           OPTIONAL,   -- Need OR
    groupHoppingDisabled-r10            ENUMERATED {true}                       OPTIONAL,   -- Need OR
    dmrs-WithOCC-Activated-r10          ENUMERATED {true}                       OPTIONAL    -- Need OR
}

PUSCH-ConfigDedicated-v1130 ::=     SEQUENCE {
    pusch-DMRS-r11                          CHOICE {
        release                                 NULL,
        setup                                   SEQUENCE {
            nPUSCH-Identity-r11                     INTEGER (0..509),
            nDMRS-CSH-Identity-r11                  INTEGER (0..509)
        }   } }

PUSCH-ConfigDedicated-v12x0::=      SEQUENCE {
    betaOffset-ACK-Index-SubframeSet2-r12       INTEGER (0..15),
    betaOffset-RI-Index-SubframeSet2-r12        INTEGER (0..15),
    betaOffset-CQI-Index-SubframeSet2-r12       INTEGER (0..15),
    betaOffsetMC-r12                    SEQUENCE {
        betaOffset-ACK-Index-MC-SubframeSet2-r12        INTEGER (0..15),
        betaOffset-RI-Index-MC-SubframeSet2-r12         INTEGER (0..15),
        betaOffset-CQI-Index-MC-SubframeSet2-r12        INTEGER (0..15)
    }                                                                           OPTIONAL    -- Need OR
}

PUSCH-ConfigDedicatedSCell-r10 ::=  SEQUENCE {
    groupHoppingDisabled-r10            ENUMERATED {true}                       OPTIONAL,   -- Need OR
    dmrs-WithOCC-Activated-r10          ENUMERATED {true}                       OPTIONAL    -- Need OR
}

UL-ReferenceSignalsPUSCH ::=        SEQUENCE {
    groupHoppingEnabled                 BOOLEAN,
    groupAssignmentPUSCH                INTEGER (0..29),
    sequenceHoppingEnabled              BOOLEAN,
    cyclicShift                         INTEGER (0..7)
}
```

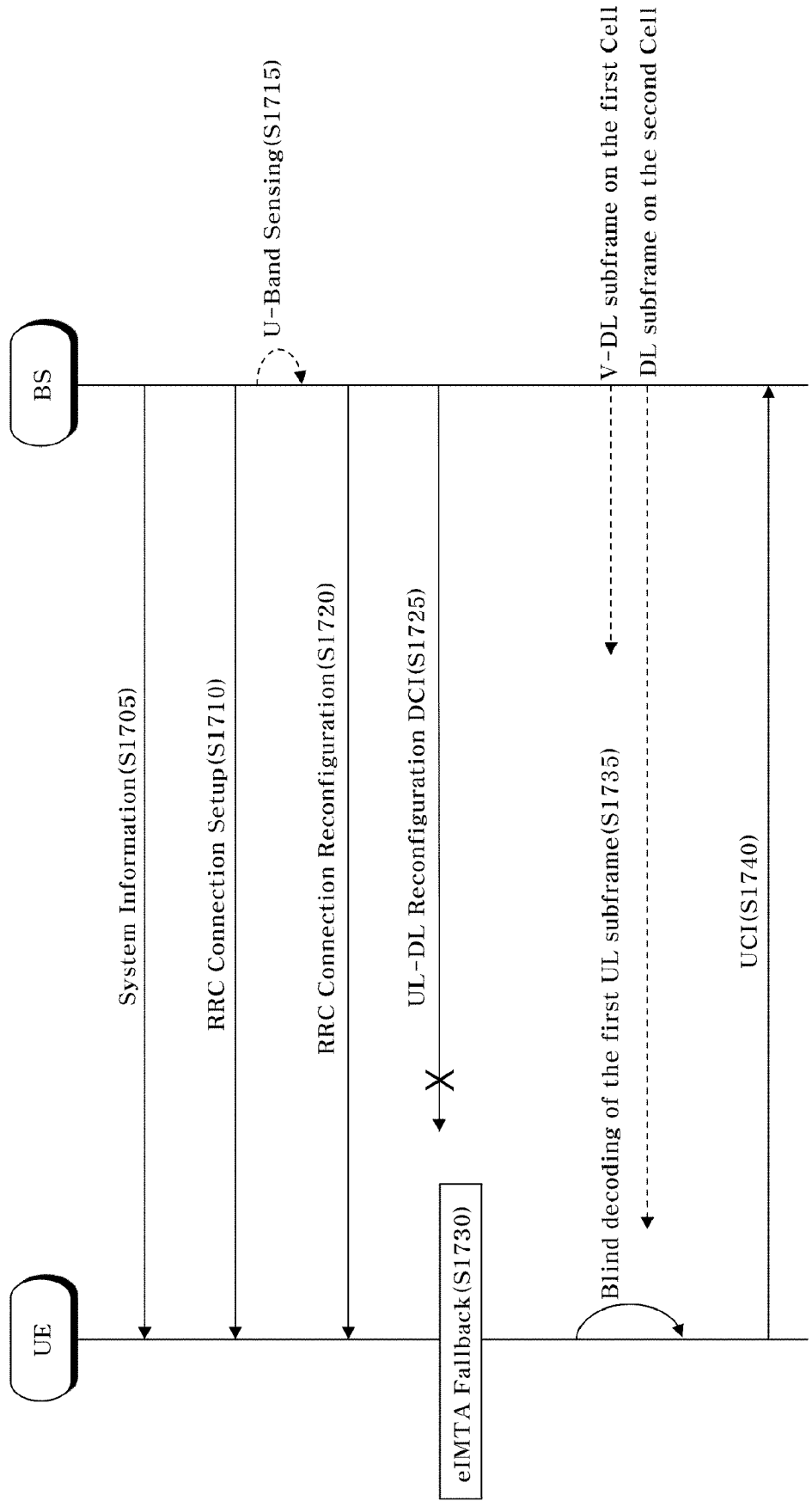

METHOD FOR TRANSMITTING AND RECEIVING SIGNAL IN WIRELESS COMMUNICATION SYSTEM AND DEVICE FOR PERFORMING SAME

This application is a 35 USC § 371 National Stage entry of International Application No. PCT/KR2015/010227 filed on Sep. 25, 2015, and claims priority to U.S. Provisional Application No. 62/056,480 filed Sep. 27, 2014, all of which are hereby incorporated by reference in their entireties as if fully set forth herein.

TECHNICAL FIELD

The present invention relates to a wireless communication system, and more particularly, to a method of transmitting and receiving a signal in wireless communication environment in which a plurality of cells are configured and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

A technical task of the present invention is to provide a method of transmitting and receiving a signal in wireless communication environment in which a plurality of cells having a different characteristic are configured and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of receiving a signal by a user equipment configured with a plurality of cells are set, includes performing blind decoding by assuming a first uplink subframe of a first cell with a time division duplex (TDD) frame structure among a plurality of the cells as a downlink subframe according to a prescribed condition, and receiving downlink data via a second cell among a plurality of the cells when a downlink grant for the second cell is detected by the blind decoding, the second cell residing on an unlicensed band. In this case, the first uplink subframe is indicated as an uplink subframe by a first uplink-downlink subframe configuration for enhanced interface mitigation and traffic adaptation (eIMTA) fallback, the first uplink-downlink subframe configuration for eIMTA fallback being contained in system information block type 1 (SIB 1), and the first uplink subframe is also indicated as a downlink subframe by a hybrid automatic repeat request (HARQ) reference configuration for the eIMTA fallback.

To further achieve these and other advantages and in accordance with the purpose of the present invention, according to a different embodiment, a user equipment in a wireless communication system includes a processor configured to perform blind decoding by assuming a first uplink subframe of a first cell with a time division duplex (TDD) frame structure among a plurality of the cells as a downlink subframe according to a prescribed condition and a receiver configured to receive downlink data via a second cell among a plurality of the cells configured in the user equipment when a downlink grant for the second cell is detected by the blind decoding, the second cell residing on an unlicensed band. In this case, the first uplink subframe is indicated as an uplink subframe by a first uplink-downlink subframe configuration for enhanced interface mitigation and traffic adaptation (eIMTA) fallback, the first uplink-downlink subframe configuration for eIMTA fallback being contained in system information block type 1 (SIB 1), and the first uplink subframe is also indicated as a downlink subframe by a hybrid automatic repeat request (HARQ) reference configuration for the eIMTA fallback.

Preferably, the unlicensed band may correspond to a frequency band where dominant use of the wireless communication system is not guaranteed.

Preferably, the prescribed condition is satisfied if it fails to obtain downlink control information for dynamically reconfiguring a second uplink-downlink subframe configuration which is configured in the user equipment.

Preferably, the prescribed condition is satisfied if physical uplink shared channel (PUSCH) transmission or sounding reference signal (SRS) transmission is not scheduled in the first uplink subframe.

Preferably, the second cell may correspond to a cell of an unlicensed band which is available only in a resource period reserved through carrier sensing.

Preferably, the user equipment can transmit ACK/NACK for the downlink data in consideration of an index difference between the first subframe of the first cell and a second subframe of the second cell in which the downlink data is received.

Preferably, the user equipment can transmit uplink control information piggy backed from the first cell via the second cell. In this case, modulation and coding scheme (MCS) information different from MCS information of the first cell can be applied to the piggy backed uplink control information.

Advantageous Effects

According to one embodiment of the present invention, a user equipment and a base station can efficiently transmit or receive a signal in wireless communication environment in which a cell of a licensed band and a cell of an unlicensed band are configured at the same time.

It will be appreciated by persons skilled in the art that that the effects achieved by the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram illustrating structures of a control plane and a user plane of a radio interface protocol between a user equipment and E-UTRAN based on the 3GPP radio access network standard;

FIG. 8 illustrates a UL HARQ operation in LTE system;

FIG. 16 is a diagram for PUSCH configuration information element in RRC layer;

FIG. 17 is a flowchart for a method of transmitting and receiving a signal according to one embodiment of the present invention;

MODE FOR INVENTION

Figure 1:
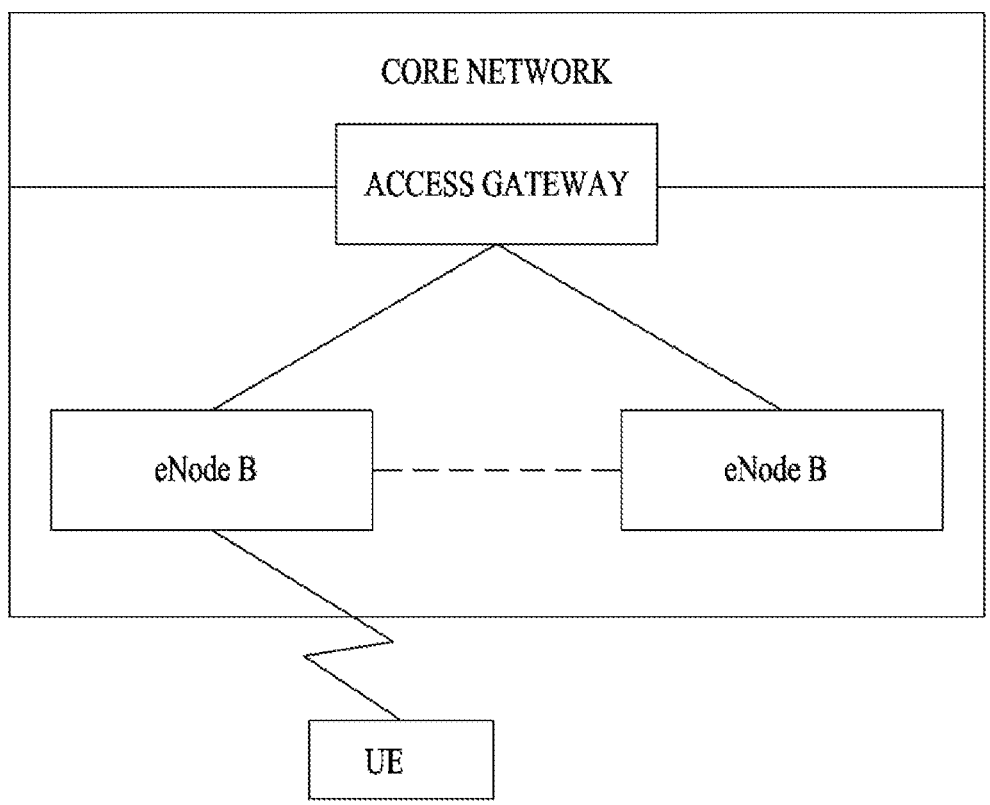
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
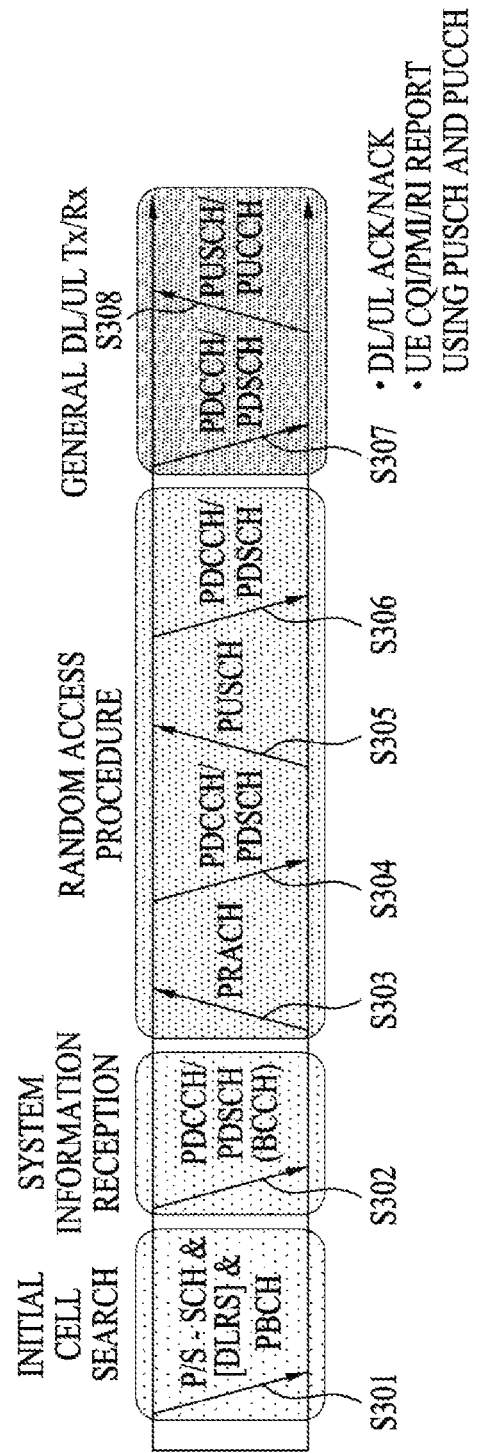
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
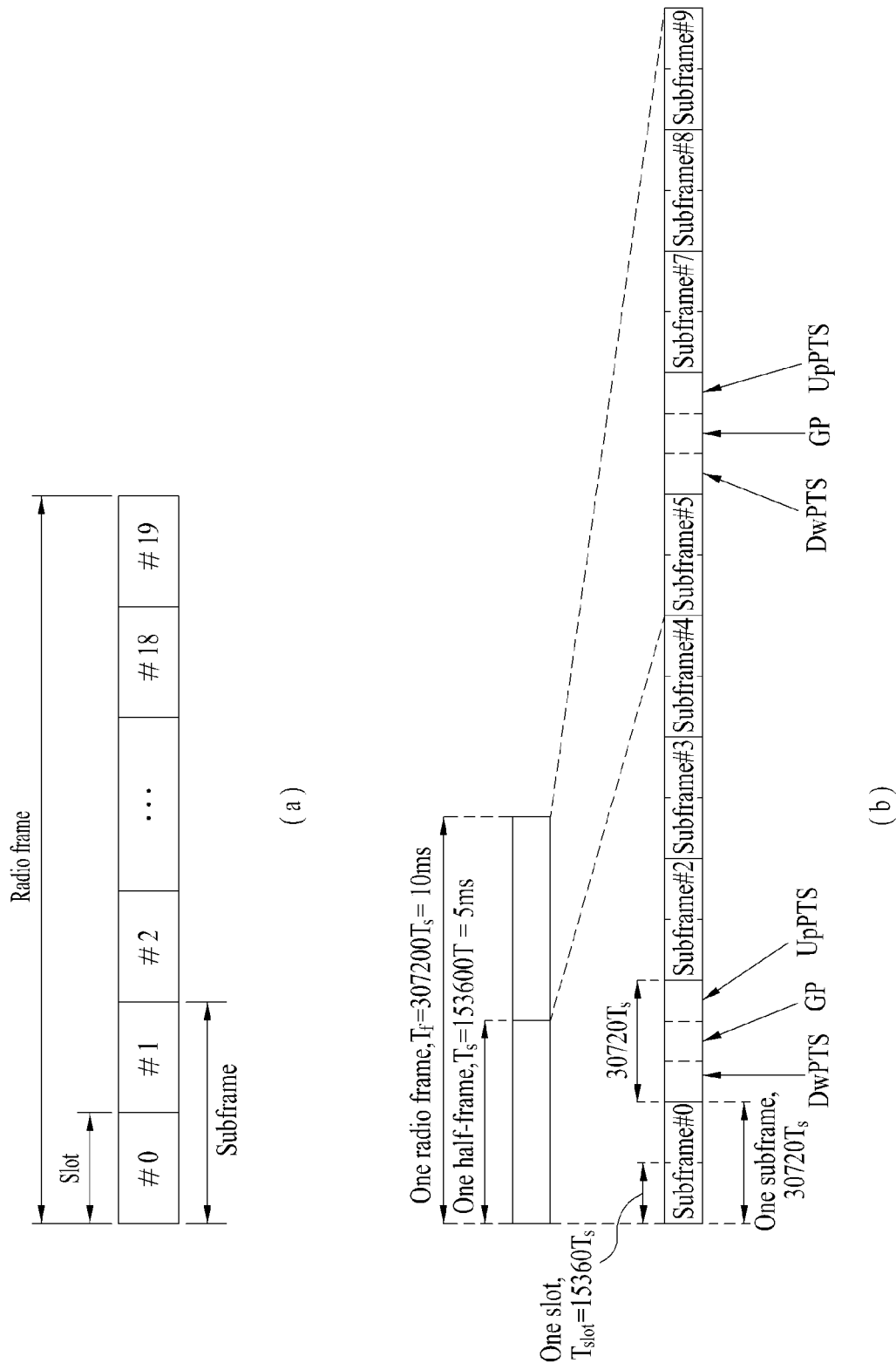
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

In the meantime, the structure of the type 2 radio frame, that is, uplink/downlink configuration (UL/DL configuration) in the TDD system is as illustrated in Table 2 below.

TABLE 2

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

TABLE 3

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 3 illustrates UL ACK/NACK timeline. If a user equipment receives PDCCH and PDSCH scheduled by the PDCCH in a subframe #(n-k), it indicates that UL ACK/NACK is transmitted in a subframe # n in response to the received PDSCH.

And, the ACK/NACK for the PDSCH is transmitted on PUCCH corresponding to a UL control channel. In this case, information transmitted through the PUCCH may vary depending on a format. It is summarized as follows.

In LTE system, a PUCCH resource for ACK/NACK is not allocated to each UE in advance. Instead, a plurality of UEs belonging to a cell use a plurality of PUCCH resources by sharing the resources at every timing. Specifically, a PUCCH resource, which is used for a UE to transmit ACK/NACK, is implicitly determined based on PDCCH carrying scheduling information on PDSCH on which corresponding DL data is carried. In each DL subframe, the whole region to which PDCCH is transmitted consists of a plurality of CCEs (control channel elements) and PDCCH transmitted to a UE consists of one or more CCEs. A CCE includes a plurality of (e.g., 9) REGs (resource element groups). One REG includes 4 adjacent REs (resource elements) except a reference signal (RS). A UE transmits ACK/NACK via an implicit PUCCH resource which is induced or calculated by a function of a specific CCE index (e.g., first or lowest CCE index) among CCE indexes constructing the PDCCH received by the UE.

In this case, each PUCCH resource index corresponds to a PUCCH resource for ACK/NACK. For example, if scheduling information on PDSCH is transmitted to a UE via PDCCH configured by CCE indexes 4 to 6, the UE can transmit ACK/NACK to a BS via PUCCH, e.g., fourth PUCCH, induced or calculated from a $4^{th}$ CCE index corresponding to the lowest CCE index among the CCEs constructing the PDCCH.

PUCCH format 1a/1b transmits A/N information, PUCCH format 2/2a/2b transmits CQI, CQI+A/N information, and PUCCH format 3 can transmit multiple A/N information.

The structure of the aforementioned radio frame is only exemplary, and various modifications may be made in the number of subframes included in the radio frame, the number of slots included in the subframe, or the number of symbols included in the slot.

Figure 5:
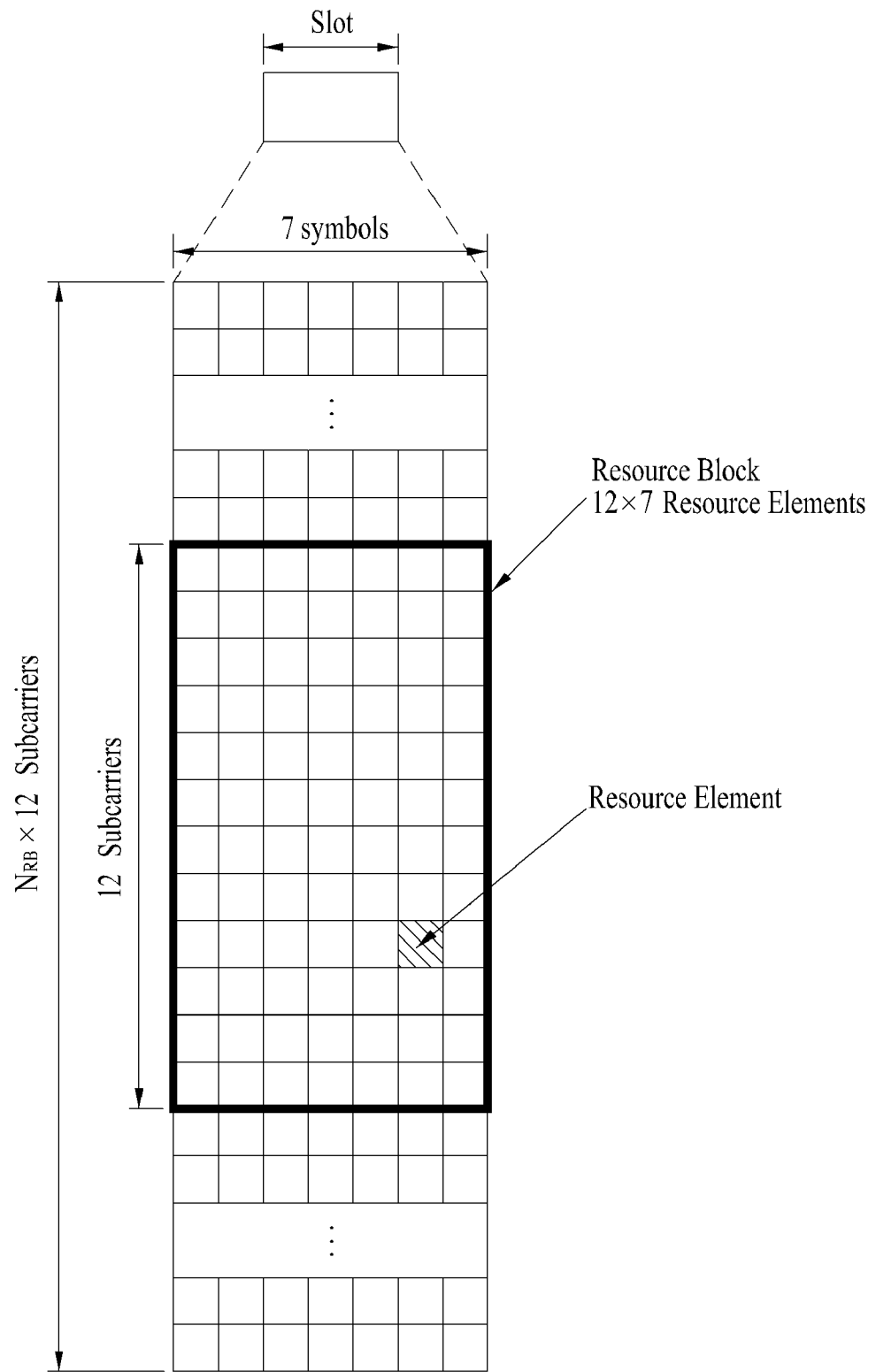
FIG. 5 is a diagram for an example of a resource grid for a downlink slot.

FIG. 5 is a diagram of a resource grid for a downlink slot.

Referring to FIG. 5, a DL slot includes $N_{symb}^{DL}$ OFDM symbols in time domain and $N_{RB}^{DL}$ resource blocks. Since each of the resource blocks includes $N_{sc}^{RB}$ subcarriers, the DL slot includes $N_{RB}^{DL} \times N_{sc}^{RB}$ subcarriers in frequency domain. FIG. 5 shows one example that the DL slot includes 7 OFDM symbols and that the resource block includes 12 subcarriers, by which the present invention is non-limited. For instance, the number of OFDM symbols included in the DL slot can be modified according to a length of a cyclic prefix (CP).

Each element on a resource grid is called Resource Element (RE) and 1 single resource element is indicated by a single OFDM symbol index and a single subcarrier index. A single RB is configured with $N_{symb}^{DL} \times N_{sc}^{RB}$ resource elements. The number $N_{RB}^{DL}$ of resource blocks included in the DL slot is dependent on a DL transmission bandwidth configured in a cell.

Figure 6:
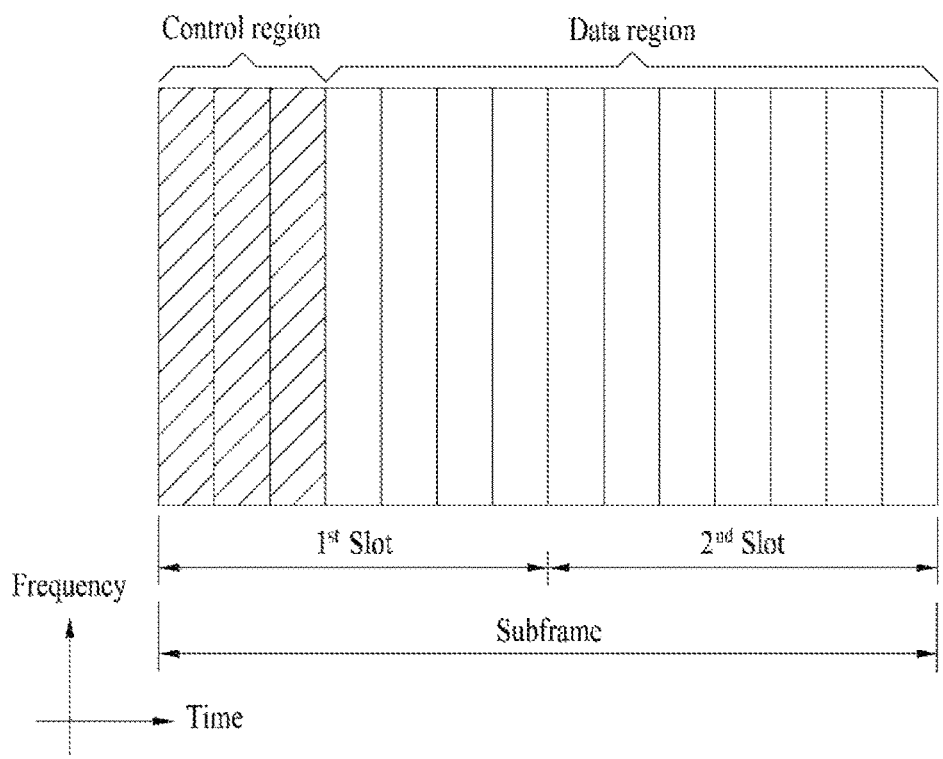
FIG. 6 is a diagram illustrating a structure of a downlink radio frame used in an LTE system.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
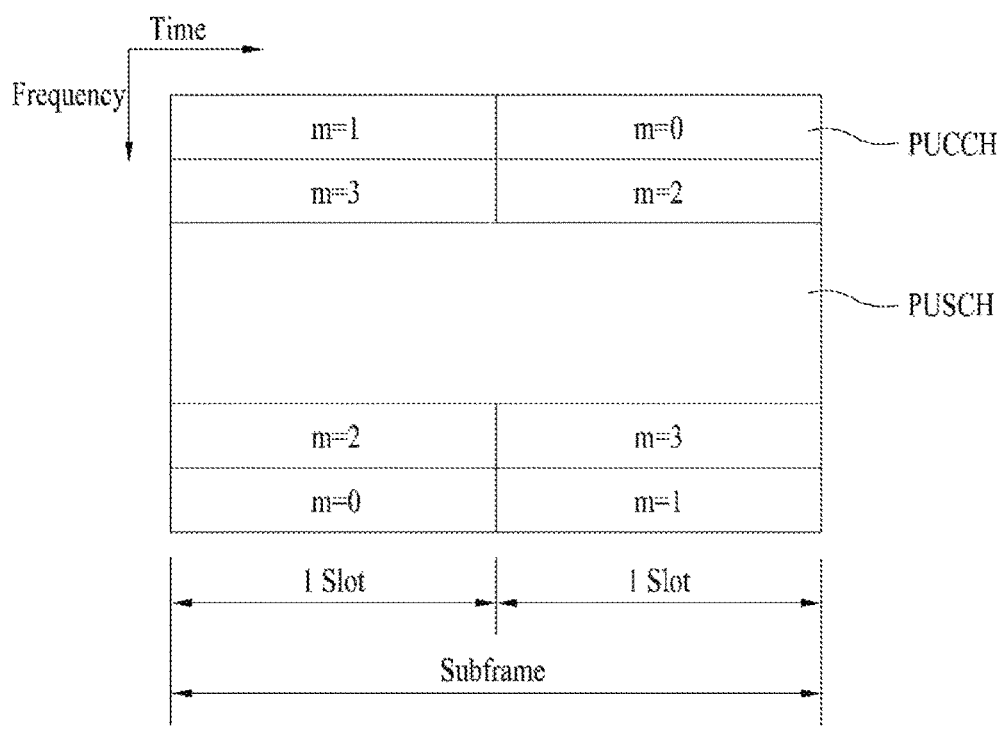
FIG. 7 is a diagram illustrating a structure of an uplink subframe used in an LTE system.

FIG. 7 is a diagram for an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

FIG. 8 is a diagram of a resource unit used for constructing a downlink control channel in LTE system. In particular, FIG. 8(a) indicates a case that the number of transmitting antennas of an eNode B corresponds to 1 or 2 and FIG. 8(b) indicates a case that the number of transmitting antennas of the eNode B corresponds to 4. A reference signal (RS) pattern varies according to the number of transmitting antennas but a method of configuring a resource unit in relation to a control channel is identical irrespective of the number of transmitting antennas.

Referring to FIG. 8, a base resource unit of a downlink control channel is a REG (resource element group). The REG consists of 4 neighboring resource elements except an RS. The REG is represented in the drawing with a bold line. The PCFICH and the PHICH include 4 REGs and 3 REGs, respectively. The PDCCH consists of a CCE (control channel element) unit and one CCE includes 9 REGs.

In order for a UE to check whether the PDCCH consisting of L number of CCEs is transmitted to the UE, the UE is configured to check the CCEs contiguously arranged by $M^{(L)}$ (≥L) number of CCEs or a specific rule. A value of the L, which should be considered for the UE to receive the PDCCH, may become a plural number. The UE should check CCE aggregations to receive the PDCCH. The CCE aggregations are called a search space. As an example, the search space is defined by LTE system as Table 4 in the following.

TABLE 4

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In this case, CCE aggregation level L indicates the number of CCE consisting of PDCCH, $S_k^{(L)}$ indicates a search space of the CCE aggregation level L and $M^{(L)}$ indicates the number of candidate PDCCHs monitored in the search space of the aggregation level L.

The search space can be classified into a UE-specific search space accessible by a specific UE only and a common search space accessible by all UEs in a cell. A UE monitors the common search space of which the CCE aggregation level corresponds to 4 and 8 and monitors the UE-specific search space of which the CCE aggregation level corresponds to 1, 2, 4, and 8. The common search space and the UE-specific search space may overlap with each other.

And, a position of a first (having a smallest index) CCE in a PDCCH search space, which is given to a random UE for each CCE aggregation level value, varies in every subframe depending on a user equipment. This is called a PDCCH search space hashing.

The CCE can be distributed to a system band. More specifically, a plurality of CCEs, which are logically contiguous, can be inputted to an interleaver. The interleaver performs a function of mixing a plurality of the CCEs with each other in REG unit. Hence, frequency/time resources forming a CCE are physically distributed in the total frequency/time domain within a control region of a subframe. Consequently, although a control channel is constructed in a CCE unit, the interleaving is performed in an REG unit. Hence, frequency diversity and interference randomization gain can be maximized.

Figure 9:
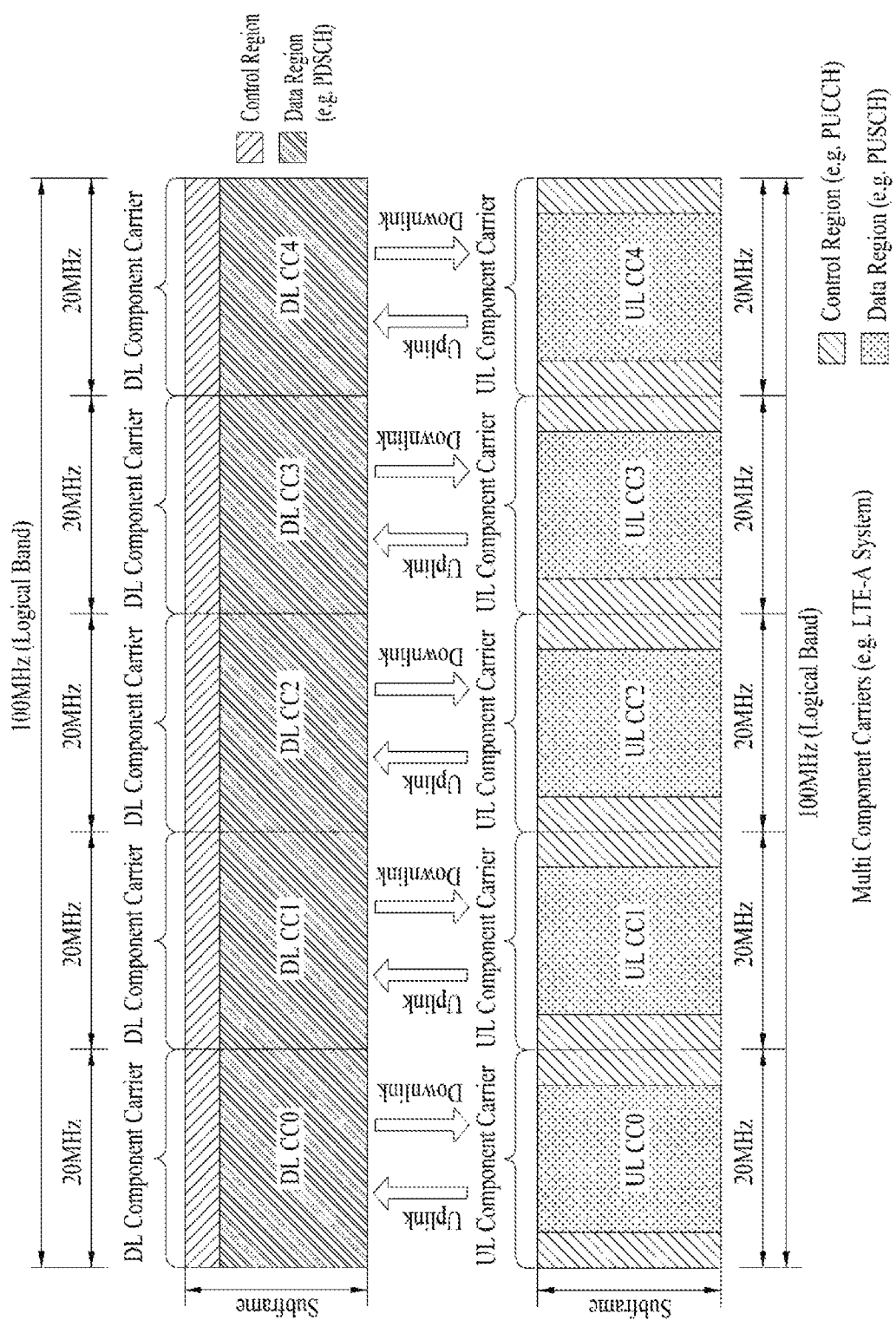
FIG. 9 is a diagram for explaining FDD system and DL/UL HARQ timeline.

FIG. 9 is a diagram for an example of a carrier aggregation (CA) communication system.

Referring to FIG. 9, a wider UL/DL bandwidth can be supported in a manner of aggregating a plurality of UL/DL component carriers (CC). Such a term as a component carrier (CC) can be replaced with a different equivalent term (e.g., carrier, cell, etc.). Each of the component carriers may be adjacent to each other or non-adjacent to each other. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC.

If cross-carrier scheduling (or, cross-CC scheduling) is applied, PDCCH for DL allocation is transmitted via a DL CC #0 and corresponding PDSCH can be transmitted via a DL CC #2. For the cross-CC scheduling, it may consider introducing a CIF (carrier indicator field). A configuration informing whether a CIF exists or not within a PDCCH can be semi-statically and user-specifically (or user group-specifically) enabled via an upper layer signaling (e.g., RRC signaling).

In case that a CIF exists within a PDCCH, a base station may be able to assign a monitoring DL CC set to reduce BD complexity of a user equipment side. The PDCCH monitoring DL CC set corresponds to a part of the entire aggregated DL CCs and includes one or more DL CCs. A user equipment may be able to perform a detection/decoding of the PDCCH on a corresponding DL CC only. In particular, the base station may be able to transmit the PDCCH via the monitoring DL CC set only. The PDCCH monitoring DL CC set may be configured UE-specifically, UE group-specifically or cell-specifically. Such a term as PDCCH monitoring DL CC can be replaced with such an equivalent term as a monitoring carrier, a monitoring cell, and the like. And, CCs aggregated for a UE can be replaced with such an equivalent term as a serving CC, a serving carrier, a serving cell, and the like.

Figure 10:
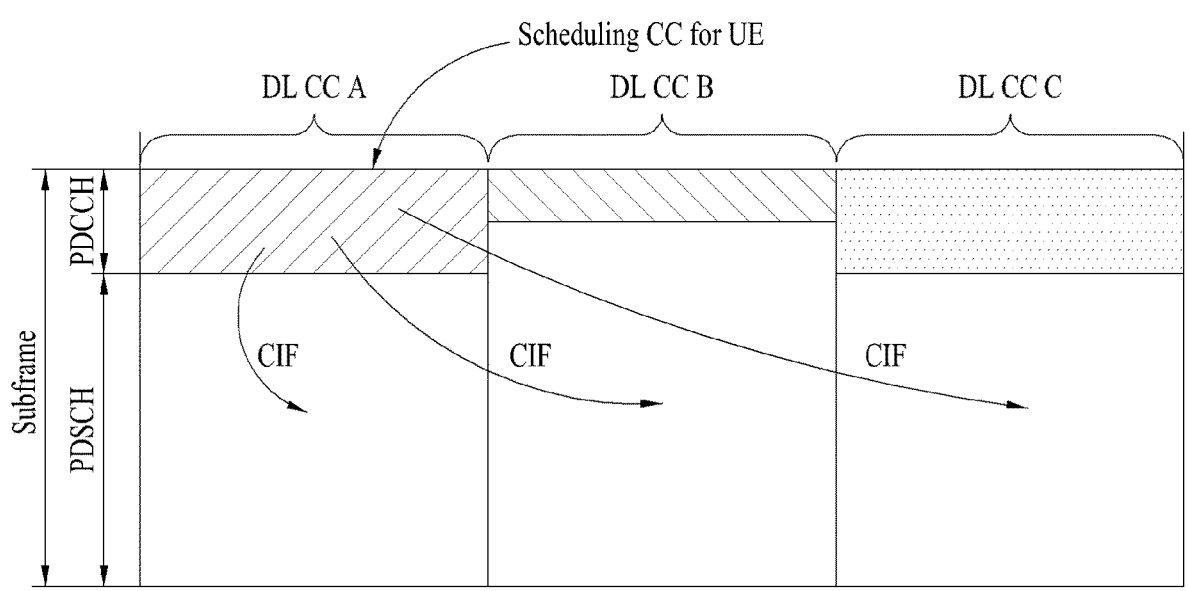
FIG. 10 illustrates scheduling in a case that a plurality of carriers are aggregated.

FIG. 10 is a diagram for an example of a case that 3 DL CCs are aggregated and a DL CC A is configured as a monitoring DL CC. DL CCs A to C can be referred to as a serving CC, a serving carrier, a serving cell, or the like. If a CIF is disabled, each of DL CCs may be able to transmit PDCCH, which schedules PDSCH of each of the DL CCs, without a CIF according to an LTE PDCCH rule. On the other hand, if the CIF is enabled by UE-specific (UE group-specific or cell-specific) upper layer signaling, only the DL CC A (monitoring DL CC) may be able to transmit the PDCCH, which schedules the PDSCH of a different DL CC as well as the PDSCH of the DL CC A using the CIF. In this case, PDCCH is not transmitted on a DL CC B and a DL CC C, which are not configured as a PDCCH monitoring DL CC. Hence, the DL CC A (monitoring DL CC) should include a PDCCH search space related to the DL CC A, a PDCCH search space related to the DL CC B, and a PDCCH search space related to the DL CC C. In the present specification, assume that a PDCCH search space is defined according to a carrier.

As mentioned in the foregoing description, LTE-A considers using a CIF in PDCCH to perform cross-CC scheduling. Whether or not a CIF is used (i.e., whether or not cross-CC scheduling mode or non-cross-CC scheduling mode is supported) and switching between modes can be semi-statically or UE-specifically configured via RRC signaling. After the RRC signaling is performed, a UE is able to recognize whether or not a CIF is used within PDCCH to be scheduled to the UE.

In the following, a HARQ (hybrid automatic repeat and request) in a wireless communication system is explained.

When there exist a plurality of UEs having data to be transmitted in UL/DL in a wireless communication system, a base station selects a UE to transmit the data from among a plurality of the UEs at every transmission unit time (transmission time interval (TTI) (e.g., subframe)). In particular, in a system using multiple carriers or a system similar to the system, the base station selects not only UEs to transmit data in UL/DL at every TTI but also a frequency band to be used by each of the selected UEs to transmit the data.

On the basis of UL, if the UEs transmit a reference signal (or pilot signal) to the base station in UL, the base station identifies channel states of the UEs using the reference signal received from the UEs and selects UEs to transmit data in UL on each unit frequency band at every TTI. The base station informs the UEs of a result of the selection. In particular, the base station transmits a UL assignment message to a UE UL scheduled at specific TTI to indicate the UE to transmit data using a specific frequency band. The UL assignment message is also referred to as a UL grant. The UE transmits the data in UL according to the UL assignment message. Basically, the UL assignment message includes information on a UE ID (UE identity), RB allocation information, payload, etc. In addition, the UL assignment message can include an IR (incremental redundancy) version, NDI (new data indication), and the like.

In case of using a synchronous non-adaptive HARQ scheme, when a UE scheduled at specific time performs retransmission, retransmission time is systematically promised between the UE and the base station (e.g., after 4 subframes from the timing at which NACK is received). Hence, the base station can transmit the UL grant message to the UE at the initial transmission only and the retransmission can be performed by ACK/NACK signal. On the contrary, in case of using an asynchronous adaptive HARQ scheme, since retransmission time is not promised between the base station and the UE, it is necessary for the base station to transmit a retransmission request message to the UE. Moreover, since a frequency resource for retransmission or MCS varies depending on transmission timing, the base station should transmit not only a UE ID, RB allocation information, and payload but also a HARQ process index, IR version, and NDI information to the UE at the time of transmitting the retransmission request message to the UE.

Figure 11:
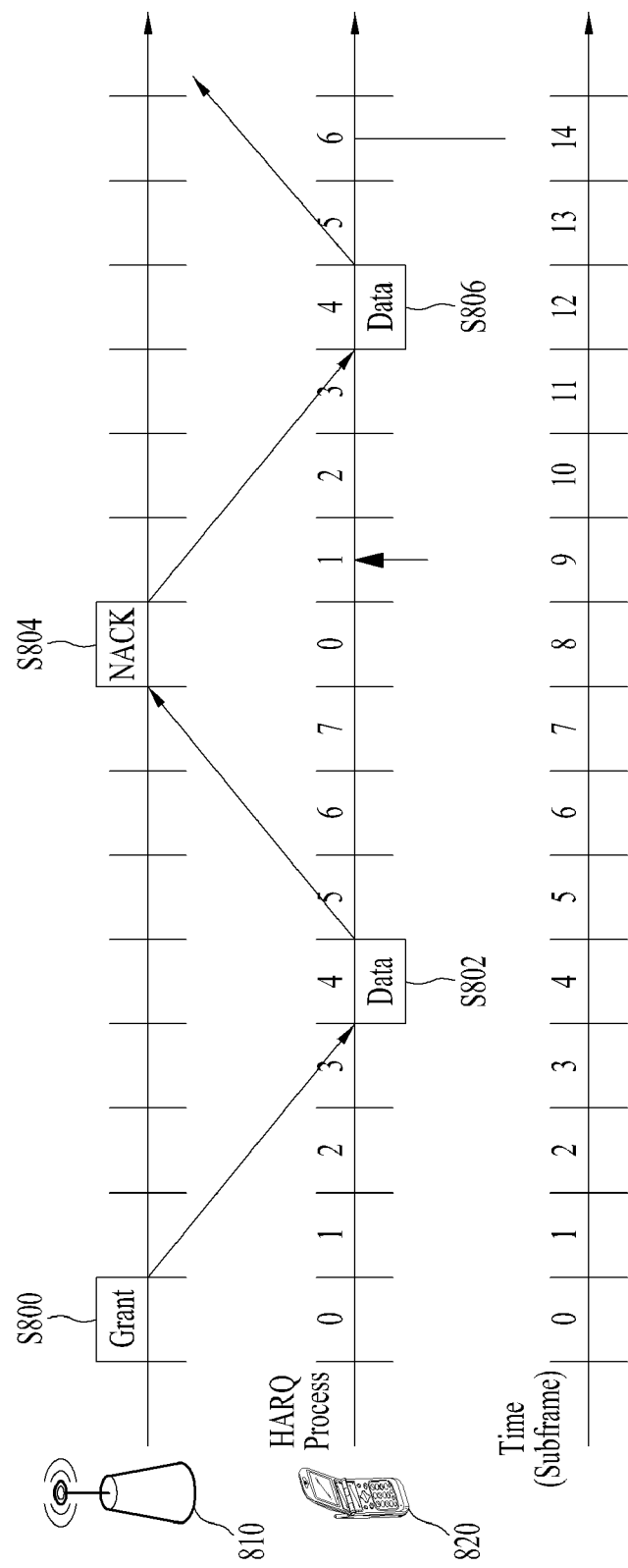
FIG. 11 illustrates a UL HARQ operation in LTE system.

FIG. 11 illustrates a UL HARQ operation in LTE system. In LTE system, a UL HARQ scheme uses synchronous non-adaptive HARQ. In case of using 8-channel HARQ, HARQ process numbers are given by 0 to 7. One HARQ process operates at every TTI (e.g., subframe). Referring to FIG. 11, a base station 810 transmits a UL grant to a UE 820 through PDCCH [S800]. The UE transmits UL data to the base station 810 using an RB designated by the UL grant and MCS after 4 subframes (e.g., subframe #4) from the timing (e.g., subframe #0) at which the UL grant is received [S802]. After the UL data received from the UE 820 is decoded, the base station 810 generates ACK/NACK. If the base station fails to decode the UL data, the base station 810 transmits NACK to the UE 820 [S804]. The UE 820 retransmits UL data to the base station after 4 subframes from the timing at which the NACK is received [S806]. In this case, the initial transmission and the retransmission of the UL data are performed by the same HARQ process (e.g., HARQ process 4).

In the following, DL/UL HARQ operation in FDD system is explained.

Figure 12:
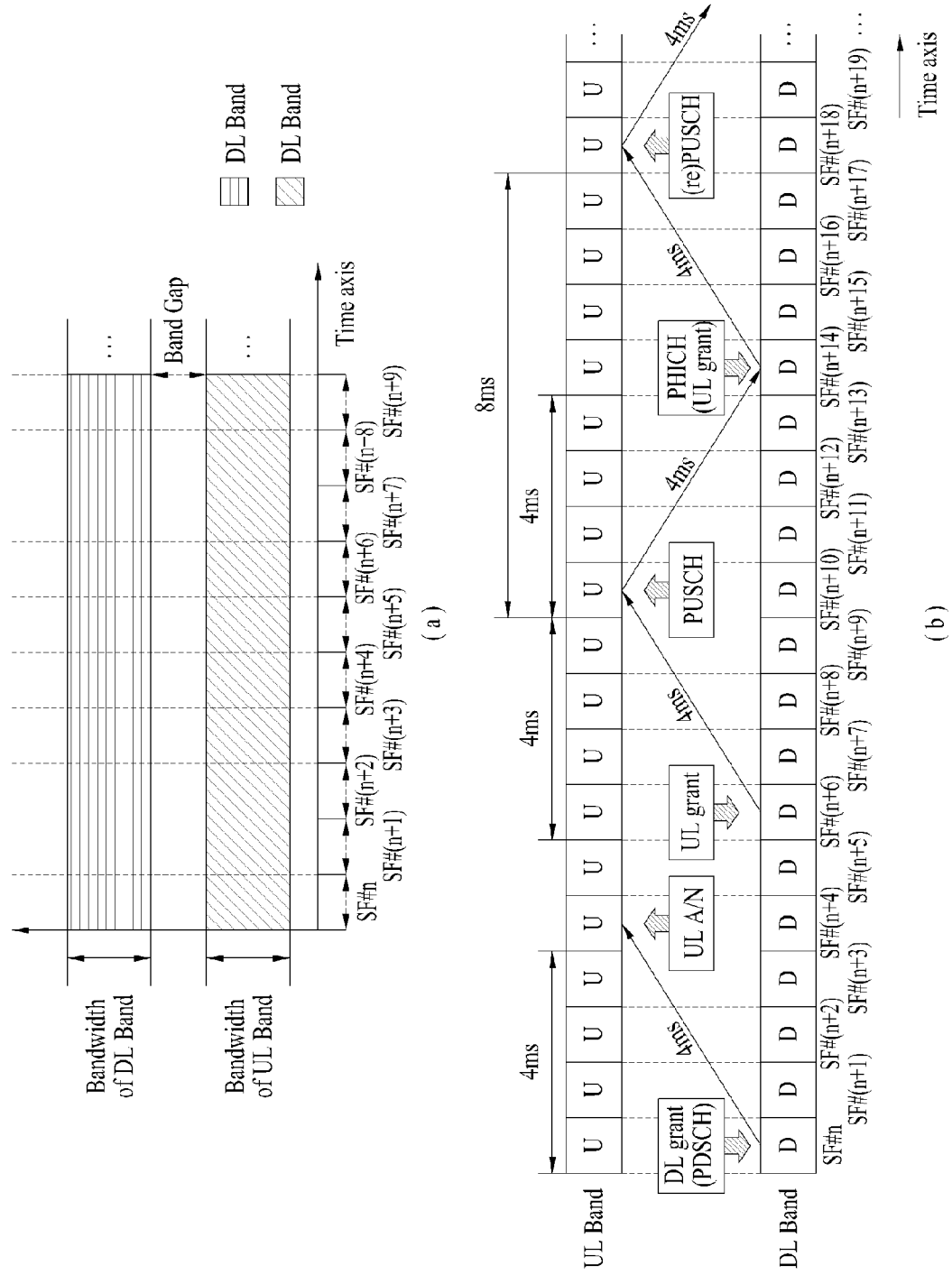
FIG. 12 is a diagram for explaining FDD system and DL/UL HARQ timeline.

FIG. 12 is a diagram for explaining a FDD system and a DL/UL HARQ timeline. In case of the FDD system illustrated in FIG. 12(a), transmission/reception of a DL/UL data corresponding to a specific UL/DL data is received after 4 ms. Referring to FIG. 12(b), for example, UL ACK/NACK is transmitted after 4 ms from the timing at which PDSCH/DL grant is received in response to the PDSCH, PUSCH is transmitted after 4 ms from the timing at which UL grant/PHICH is received in response to the UL grant/PHICH, and PHICH/UL grant is received after 4 ms from the timing at which PUSCH is transmitted/retransmitted in response to the PUSCH transmission/retransmission.

And, a synchronous HARQ scheme is used for a UL HARQ operation and an asynchronous HARQ scheme is used for a DL HARQ operation in 3GPP LTE system. The synchronous HARQ scheme corresponds to a scheme that retransmission is performed at a timing determined by a system when initial transmission fails. In particular, transmission/retransmission of UL data interlocked with a specific HARQ process or timing associated with a UL grant/PHICH timeline is defined in advance and it is difficult to randomly change the transmission/retransmission or the timing. On the contrary, according to the asynchronous HARQ scheme, when an initial transmission of data fails, retransmission of the data can be performed at a random timing appearing after 8 ms including the initial transmission timing.

In the aforementioned FIGS. 11 and 12, each of the HARQ processes is defined by a unique HARQ process identifier having a size of 3 bits and it is necessary for a receiving end (i.e., a UE in a DL HARQ process, an eNB in a UL HARQ process) to allocate an individual soft buffer to combine retransmitted data.

In the following, HARQ timing in environment in which a TDD cell and a FDD cell are aggregated is explained. For example, assume that a TDD Pcell and a FD Scell are aggregated by CA (carrier aggregation). If a UE apply DL timing (e.g., 4 ms) defined for legacy FDD to PDSCH received via the FDD Scell as it is, since the TDD Pcell is configured by a DL subframe at the DL HARQ timing, it may be difficult to transmit ACK/NACK. Hence, when the TDD cell and the FDD cell are aggregated, it may define new DL HARQ timing and new UL HARQ timing. Examples of the new DL HARQ timing and the new UL HARQ timing are described in the following.

DL HARQ timing for TDD Scell, in case of FDD Pcell

In case of performing self-scheduling and cross carrier scheduling, HARQ timing for PDSCH of the TDD Scell can be configured to be identical to HARQ timing for the FDD Pcell. For example, ACK/NACK information on PDSCH of the Scell can be transmitted via the Pcell.

UL HARQ timing for TDD Scell, in case of FDD Pcell

Self-scheduling: HARQ timing for PUSCH transmitted via the Scell can be configured based on HARQ timing scheduled to the TDD cell.

Cross carrier scheduling: (i) Similar to the self-scheduling, HARQ timing for PUSCH transmitted via the Scell can be configured based on HARQ timing scheduled to the TDD cell. (ii) Or, ACK/NACK information can be received via PHICH after 6 ms from timing at which PUSCH is transmitted via the Scell. (iii) Or, HARQ timing can be configured based on reference UL-DL configuration obtained by a scheduling cell.

DL HARQ timing for FDD Scell, in case of TDD Pcell

Self-scheduling: (i) HARQ timing for PDSCH of the Scell can be configured by additional timing different from HARQ timing of the TDD Pcell and HARQ timing of the TDD Pcell based on UL-DL configuration of the TDD Pcell. Or, It may define new timing including more DL subframes than the legacy TDD Pcell HARQ timing according to UL-DL configuration of the TDD Pcell. For details, it may refer to Table 5 in the following. (ii) Or, HARQ timing for PDSCH of the Scell can be determined based on reference UL-DL configuration set to the FDD Scell. The reference UL-DL configuration can be determined based on UL-DL configuration of the TDD Pcell. And, it may configure additional HARQ timings different from the HARQ timing of the TDD Pcell. For more details, it may refer to Tables 6, 7, and 8 in the following.

Cross carrier scheduling: HARQ timing for PDSCH of the Scell can be configured to be identical to the self-scheduling or the HARQ timing of the TDD Pcell.

UL HARQ timing for FDD Scell, in case of TDD Pcell

Self scheduling: HARQ timing for PUSCH transmitted via the Scell can be configured by FDD HARQ timing.

Cross carrier scheduling: (i) HARQ timing for PUSCH transmitted via the Scell may follow HARQ timing of the TDD Pcell or FDD HARQ timing. (ii) Or, as an example, ACK/NACK information can be received via PHICH after 6 ms from timing at which PUSCH is transmitted via the Scell. Unlikely, it may configure by FDD HARQ timing.

Table 5 corresponds to a TDD Pcell case and shows detail examples of (i) the self-scheduling case of the DL HARQ timing (e.g., 'DL association set index') for the FDD Scell.

TABLE 5

| UL-DL Conf. | HARQ timing | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 0A | — | — | 6, [5] | [5], [4] | 4 | — | — | 6, [5] | [5], [4] | 4 |
| 0 | 0B | — | 6, [5], [4] | | [5], 4 | | | 6, [5], [4] | | [5], 4 | |
| 1 | 1 | — | — | 7, 6, [5] | [5], 4 | — | — | — | 7, 6, [5] | [5], 4 | — |
| 1 | 1* | — | — | 7, 6 | [6], [5], 4 | | | | 7, 6 | [6], [5], 4 | — |
| 2 | 2 | — | — | 8, 7, 6, [5], 4 | — | — | — | — | 8, 7, 6, [5], 4 | — | — |
| 3 | 3 | — | — | 11, [10], [9], [8], 7, 6 | 6, 5 | 5, 4 | — | — | — | — | — |
| 3 | 3a | — | — | 11, [10], 7, 6 | [10], 6, 5 | [10], 5, 4 | | | | | |
| 4 | 4 | — | — | 12, 11, [10], [9], 8, 7 | 7, 6, 5, 4 | | | | | | |
| 4 | 4a | | | 12, 11, [10], 8, 7 | [10], 7, 6, 5, 4 | | | | | | |
| 5 | 5 | — | — | 13, 12, 11, [10], 9, 8, 7, 6, 5, 4 | — | — | — | — | — | — | — |
| 6 | 6 | — | — | [8], 7 | 7, [6] | [6], 5 | — | — | 7 | 7, [6], [5] | — |
| 6 | 6* | — | — | 7 | 7, [6], [5] | 5 | — | — | 7, [6], [5], [4] | 7 | — |

In Table 5, UL-DL configuration may correspond to U/D configuration of the TDD Pcell. DL HARQ timing for the FDD Scell can be defined by a type/index of HARQ timing associated with the TDD Pcell U/D. 'DL association set index' may correspond to "[ ]" in Table 5. In particular, the "[ ]" may correspond to a DL association set index added to the TDD Pcell U/D configuration. For example, in case of UL-DL configuration 0 and HARQ timing 0A, a subframe #2 transmit ACK/NACK for PDSCH (i.e., subframe #6 of a previous frame) of the FDD Scell which is received 5 subframes ahead and ACK/NACK for PDSCH (i.e., subframe #7 of a previous frame) of the FDD Scell which is received 6 subframes ahead, respectively. A subframe #3 transmit ACK/NACK for PDSCH (i.e., subframe #8 of a previous frame) of the FDD Scell which is received 5 subframes ahead and ACK/NACK for PDSCH (i.e., subframe #9 of a previous frame) of the FDD Scell which is received 4 subframes ahead, respectively.

Tables 6, 7, and 8 correspond to a TDD Pcell case and shows detail examples of (ii) the self-scheduling case of the DL HARQ timing (e.g., 'DL association set index') for the FDD Scell.

TABLE 6

| TDD PCell U/D configuration | Allowed reference configuration for FDD SCell |
|---|---|
| 0 | {0, 1, 2, 3, 4, 5, 6} |
| 1 | {1, 2, 4, 5} |
| 2 | {2, 5} |
| 3 | {3, 4, 5} |
| 4 | {4, 5} |
| 5 | {5} |
| 6 | {1, 2, 3, 4, 5, 6} |

TABLE 7

| TDD PCell U/D configuration | Allowed reference configuration for FDD SCell |
|---|---|
| 0 | {2, 4, 5} |
| 1 | {2, 4, 5} |
| 2 | {2, 5} |
| 3 | {4, 5} |
| 4 | {4, 5} |
| 5 | {5} |
| 6 | {2, 4, 5} |

TABLE 8

| TDD PCell U/D configuration | Allowed reference configuration for FDD SCell (2 aggregated cells) | Allowed reference configuration for FDD SCell (more than 2 aggregated cells) |
|---|---|---|
| 0 | 5 | 2 |
| 1 | 5 | 2 |
| 2 | 5 | 2 |
| 3 | 5 | 4 |
| 4 | 5 | 4 |
| 5 | 5 | Not applicable |
| 6 | 5 | 2 |

In the following, ACK/NACK multiplexing or bundling scheme is explained.

An ACK/NACK multiplexing (i.e., ACK/NACK selection) method applied to Rel-8 TDD system considers an ACK/NACK selection scheme that uses an implicit PUCCH resource corresponding (i.e., linked to a lowest CCE index) to PDCCH scheduling each PDSCH of a UE to secure a PUCCH resource of the UE.

Meanwhile, LTE-A FDD system basically considers transmitting a plurality of ACKs/NACKs in response to a plurality of PDSCHs, which are transmitted via a plurality of DL component carriers, through a UE-specifically configured specific UL CC. To this end, LTE-A FDD system considers "ACK/NACK selection" scheme using an implicit PUCCH resource linked with PDCCH that schedules a specific DL component carrier, a part of DL component carriers, or all DL component carriers (i.e., linked with a lowest CCE index nCCE, or nCCE and nCCE+1), or a combination of the implicit PUCCH resource and an explicit PUCCH resource reserved to each UE in advance via RRC signaling.

LTE-A TDD system can also consider a situation that pluralities of component carriers are aggregated. Hence, it may consider transmitting a plurality of ACK/NACK information/signals in response to a plurality of PDSCHs, which are transmitted via a plurality of DL subframes and a plurality of component carriers, in UL subframes corresponding to a plurality of the DL subframes via a specific CC (i.e., AN/CC). In this case, unlike the LTE-A FDD, it may consider a scheme of transmitting a plurality of ACKs/NACKs corresponding to the maximum number of CWs capable of being transmitted via all component carriers assigned to a UE to all of a plurality of DL subframes (i.e., full ACK/NACK) or a scheme of transmitting ACKs/NACKs by reducing the number of ACKS/NACKs by applying ACK/NACK bundling to CW and/or CC and/or SF domain (i.e., bundles ACK/NACK). In this case, in case of the CW bundling, ACK/NACK bundling for CW is applied to each DL subframe according to a component carrier. In case of the CC bundling, ACK/NACK bundling for all or a part of CCs is applied to each DL subframe. In case of the SF bundling, ACK/NACK bundling for all or a part of DL SFs is applied to each CC.

Meanwhile, LTE-A system considers transmitting a plurality of ACK/NACK information/signals for a plurality of PDSCHs, which are transmitted via a plurality of DL component carriers (DL CCs), via a specific UL component carrier (UL CC). In this case, unlike ACK/NACK transmission using a PUCCH format 1a/1b in legacy Rel-8 LTE, it may consider a method of transmitting a plurality of ACK/NACK information and/or control signals using a PUCCH format 2 or a PUCCH format 3 corresponding to a form modified based on block-spreading scheme after channel coding (e.g., Reed-Muller code, Tail-biting convolutional code, etc.) is performed on a plurality of the ACK/NACK information.

In this case, the block-spread scheme corresponds to a method of modulating control information (e.g., ACK/NACK, etc.) transmission using SC-FDMA scheme rather than a PUCCH format 1 or 2 of legacy LTE. According to the block-spread scheme, a symbol sequence can be transmitted in a manner of being spread in time domain by an OCC (orthogonal cover code). In this case, it may be able to multiplex control signals of a plurality of UEs with the same resource block (RB) using the OCC.

Figure 13:
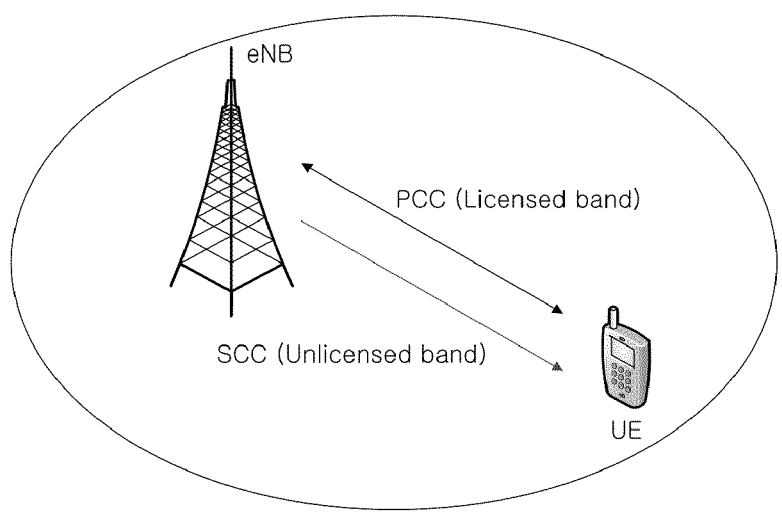
FIG. 13 is a diagram for an example of a method of using an unlicensed band.

FIG. 13 is a diagram for an example of a method of using an unlicensed band.

For example, a licensed band may correspond to a frequency band that a communication service provider has secured the dominant use of the frequency band via such a procedure as auction or the like.

On the other hand, an unlicensed band corresponds to a band that the dominant use of the band is not secured. Hence, the great number of communication equipments can use the band without restriction. The unlicensed band can also be referred to as an ISM (industrial, scientific, medical) band. If a neighbor band protection rule equal to or greater than a prescribed level and interference-related rule are kept on the unlicensed band, the great number of communication equipments can use the unlicensed band without any restriction. As a result, it is difficult to secure communication quality of a level capable of being provided by a communication service via a licensed band of which the dominant use is guaranteed. More specifically, an unlicensed band corresponds to an internationally assigned frequency band for industrial, scientific, and medical purposes.

For example, 902 to 928 MHz band, 100 MHz band of 2.4 to 2.5 GHz at which wireless LAN service is activated, or 150 MHz band of 5.725 to 5.875 GHz may correspond to a representative unlicensed band. Yet, In Korea, 902 MHz band is not the ISM band.

2.4 GHz band has a merit in that the band has a wide bandwidth and a relatively low frequency. In most areas, 2.4 GHz band is defined as an unlicensed band. Hence, WLAN standards based on IEEE 802.11b/g/n are designed based on the 2.4 GHz band. Currently, many WLAN APs (access points) are installed on the 2.4 GHz band.

In case of 5 GHz band, a frequency resource of about 500 MHz bandwidth is allocated for the usage of unlicensed band in leading countries including the United States, Europe, and Korea. In the future, it is expected that bandwidths as much as maximum 195 MHz are to be additionally excavated depending on a country. Currently, 5 GHz band is getting most spotlights among unlicensed bands capable of being internationally worked together. Compared to 2.4 GHz band, 5.8 GHz band has a merit in that interference is low.

A cellular communication system according to one embodiment of the present invention can utilize 5 GHz unlicensed band or 2.4 GHz band used by WiFi system for traffic offloading.

Since an unlicensed band basically assumes that wireless transmission and reception are performed via contention between communication nodes, it is required for each communication node to perform channel sensing before a signal is transmitted to check a signal is not transmitted by a different communication node. The channel sensing is referred to as CCA (clear channel assessment) or carrier sensing. In LTE system, it is necessary for an eNB or a UE to perform the CCA to transmit a signal on an unlicensed band (hereinafter, LTE-U band).

For example, when the eNB or the UE transmits a signal, it is also necessary for other communication nodes such as WiFi and the like to perform the CCA to prevent interference. For example, in the Wi-Fi standard (e.g., 801.11ac), a CCA threshold is specified to be −62 dBm for non-Wi-Fi signals and −82 dBm for Wi-Fi signals. Accordingly, STA/AP does not perform signal transmission so as not to cause interference when a non-WiFi signal is received at a power greater than or equal to −62 dBm. In a Wi-Fi system, the STA or AP may perform CCA and signal transmission if a signal above a CCA threshold is not detected for more than 4 μs.

According to the embodiment of FIG. 13, an eNB may transmit a signal to a UE or the UE may transmit a signal to the eNB in a CA (carrier aggregation) situation of the LTE/LTE-A licensed band and the LTE-U unlicensed band.

For clarity, assume that a Pcell (PCC) is positioned at a licensed band and at least one of SCells (SCC) is positioned at an unlicensed band, by which the present invention may be non-limited. For example, a plurality of licensed bands and a plurality of unlicensed bands can be CA or a signal can be transceived between the eNB and the UE on an unlicensed band only. Moreover, the embodiments of the present invention can be extensively applied not only to 3GPP LTE/LTE-A system, but also to other wireless communication systems.

Figure 14:
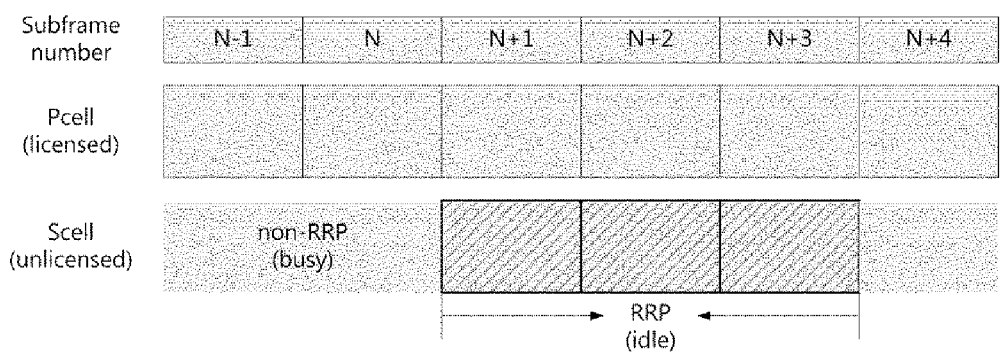
FIGS. 14 and 15 are diagrams for examples of a method of occupying and using an unlicensed band.
Figure 15:
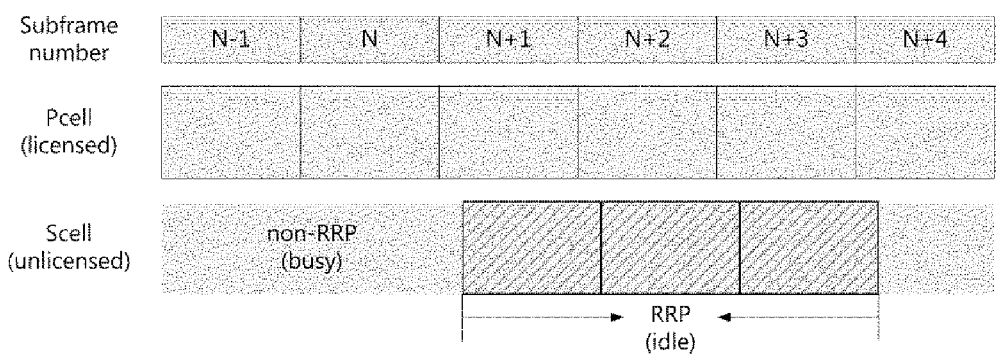

FIGS. 14 and 15 are diagrams for examples of a method of occupying and using an unlicensed band.

As mentioned in the foregoing description, in order to perform communication between an eNB and a UE in an LTE-U band, the LTE-U band should be occupied/secured for a specific time period through contention with other communication systems (e.g., Wi-Fi). For simplicity, the time period occupied/secured for communication in the LTE-U band is referred to as a reserved resource period (RRP).

There are various methods for securing the RRP. For example, a specific reservation signal may be transmitted such that other communication system devices such as Wi-Fi can recognize that the corresponding wireless channel is busy. For example, the eNB may continuously transmit a signal (e.g., RS and/or data) equal to greater than a prescribed power level during the RRP. The eNB may signal the UE of the predetermined RRP to allow the UE to maintain a link during the indicated RRP. For example, the eNB may signal RRP capable of being used by a CC of the LTE-U band via another carrier aggregated CC (e.g., LTE-A band).

As a different example of an unlicensed band operation operated by a contention-based random access scheme, the eNB can perform carrier sensing (CS) before data is transmitted and received. As a result of the CS, if a band at which an Scell is positioned is idle, the eNB can transmit a scheduling grant of the Scell, which is cross carrier scheduled via (E)PDCCH of the Pcell, or transmit a scheduling grant via PDCCH of self-scheduled Scell.

The RRP can be configured by M number of consecutive subframes. The eNB can signal the UE of M value and the usage of the M number of subframes via higher layer signaling (e.g., via Pcell) or a physical layer control/data channel.

The start timing of the RRP can be periodically configured via higher layer signaling or can be semi-statically configured. Or, the start timing of the RRP interval can be signaled at an SF # n or an SF #(n-k) appearing prior to the SF # n as many as k subframes via physical layer signaling.

According to the embodiment of FIG. 14, the RRP may be configured such that the SF boundary and the SF number/index thereof are aligned with the PCell (hereinafter, "aligned-RRP"), or configured such that the SF boundary or the SF number/index is not aligned with the PCell (hereinafter, "floating-RRP"). If an interval between a subframe of a first cell and a subframe of a second cell is equal to or less than prescribed time (e.g., CP length, or X usec where X≥0), it can be regarded as a subframe boundary between the first cell and the second cell is aligned.

Meanwhile, according to one embodiment, a reference cell used to determine a subframe boundary or a symbol boundary of the Scell of the LTE-U band (hereinafter, Ucell) can be defined as the Pcell in the aspect of time/frequency synchronization.

In the present invention, similar to the aforementioned LTE-U system opportunistically operating based on a CS (carrier sensing) operation on an unlicensed band, the present invention proposes methods of efficiently performing communication in a CA situation including a cell (carrier) that an available resource section is aperiodically or discontinuously secured/configured.

According to one embodiment, a control information channel for PDSCH/PUSCH, which is transmitted via a subframe within UCell RRP, can be transmitted via a PCell (i.e., cross carrier scheduling, CCS) or the UCell (i.e., self-scheduling, SFS).

According to a different embodiment, a control information channel for PDSCH, which is transmitted via a subframe within the UCell RRP, can be configured to schedule PDSCH which is received in a subframe identical to a subframe in which the control information is received (i.e., single subframe scheduling, SSFS) or can be configured to schedule PDSCHs received from a plurality of subframes at a time (i.e., multi subframe scheduling, MSFS). In case of the MSFS, the number of PDSCHs scheduled at a time can be defined in advance or can be signaled via higher layer signaling.

Since RRP on the UCell is aperiodically or discontinuously configured depending on a CS result, the RRP interval can be newly defined or interpreted in terms of a UE operation and assumption. As an example, the RRP on the UCell may correspond to a section that the UE performs time/frequency synchronization on the UCell, a section assumed as a synchronization signal for synchronization is transmitted (e.g., PSS, SSS from eNB), a section assumed as the UE performs CSI measurement on the UCell or a reference signal (e.g., CRS, CSI-RS from eNB) for measuring CSI is transmitted from an eNB, a section that the UE performs DCI detection on data transmission and reception in the UCell, or a section that the UE buffers a signal received in the UCell. The buffering can be temporarily performed.

In the following, eIMTA (enhanced interface mitigation & traffic adaptation) fallback mode defined in LTE system is explained with reference to Table 9. A cell or an eNB operating in the eIMTA can dynamically change TDD UL-DL configuration information via a reconfiguration DCI according to a change of load state of the cell or the eNB.

TABLE 9

CSI MEASUREMENT OPERATION
    When a UE decodes explicit L1 signaling of reconfiguration correctly
    and detects a valid UL-DL configuration, the UE shall measure CSI
    only within the subframes indicated as DL subframe or special sub-
    frame by the explicit L1 signaling of reconfiguration.
    If UE does not detect L1 signaling conveying a valid UL-DL config-
    uration for a radio frame, the UE shall measure CSI only within
    the subframes indicated as DL subframe or special subframe by
    SIB configuration.
PDCCH (AND/OR PDSCH) MONITORING (OR RECEPTION) OPERATION
    If UE detects L1 signaling conveying a valid UL-DL configuration
    for a radio frame,
        UE shall monitor the non-DRX DL subframes or special sub-
        frames indicated by explicit L1 signaling.
    If UE does not detect L1 signaling conveying a valid UL-DL config-
    uration for a radio frame,
        UE shall monitor the non-DRX DL subframes or special sub-
        frames for PDCCH or EPDCCH as indicated by SIB-1 config-
        uration.
VALID UL-DL CONFIGURATION DETERMINATION
    DL HARQ reference configuration can choose from Rel-8 TDD UL-
    DL configurations {2, 4, 5}.
    For UE configured with TDD eIMTA, uplink scheduling timing and
    HARQ timing follow UL-DL configuration signaled in SIB1.
    For valid UL & DL reference configurations:
        The set of UL subframes of the DL HARQ reference config-
        uration should be a subset of the UL subframes of the UL
        HARQ reference UL/DL configuration.
    For validity of UL/DL configuration in a reconfiguration DCI
    under any valid UL & DL HARQ reference configurations:
        The UE should not expect any subframe configured as UL
        subframe or special subframe in DL HARQ reference con-
        figuration is dynamically used as a DL subframe.
        The UE should not expect any subframe configured as DL
        subframe or special subframe in UL HARQ reference config-
        uration is dynamically used as a UL subframe.
UL GRANT/PHICH VALIDATION
    Under fallback, if the UE receives a UL grant corresponding to at
    least one UL subframe per SIB1 not in the set of UL subframes per
    DL HARQ reference configuration, the UE still treats it as a
    valid grant.
    Under fallback, if the UE receives a NAK in PHICH triggering
    PUSCH transmission in a UL subframe per SIB1 not in the set
    of UL subframes per DL HARQ reference configuration, the
    UE transmits PUSCH.
SRS TRANSMISSION VALIDATION
    For type 1 SRS, the determination of the subframe where the type 1
    SRS is due for transmission when triggered is based on SIB1.
    For both type 0 and type 1 SRS, SRS transmissions can be configured
    in a UL subframe or UpPTS based on SIB1.
        If a UE detects L1 signaling conveying a valid UL-DL config-
        uration for radio frame(s), and if the UL subframe or UpPTS
        for SRS transmission is changed to DL subframe, the UE shall
        drop the SRS transmission.
        If a UE does not detect L1 signaling conveying a valid UL-DL
        configuration for radio frame(s),
            The UE still transmits the type 1 SRS in uplink subframes and special
            subframes indicated based on SIB1, but the UE shall drop the type 0 SRS
            transmission in a subframe not indicated as UL subframe or UpPTS by the
            DL-HARQ reference configuration if there is no PUSCH transmission in
            the same subframe.

As shown in Table 9, as an example, if eIMTA UE fails to successfully receive reconfiguration DCI or obtains invalid UL-DL configuration despite the UE receives the reconfiguration DCI, the UE may perform (E)PDCCH monitoring operation, PDSCH/PDSCH RE reception, PUSCH/PUSCH RE transmission, and/or CSI measurement based on prescribed information. This is referred to as an eIMTA fallback mode. The prescribed information for the eIMTA fallback mode (hereinafter, eIMTA FB_MODE) includes SIB1 UL-DL configuration received in advance and/or DL-HARQ reference configuration.

In the following, embodiments of a CA operation based on UCell RRP are explained. If a UCell has a TDD frame structure, RRPs can be configured by DL SFs only (e.g., via a predefined signal or a rule) or a combination of DL SFs and UL SFs. Embodiments described in the following can be configured to be restrictively applied to a case that the UCell is used by SSFS scheme only or a case that the UCell is used by MSFS scheme only. In case of performing CCS, a scheduling cell and a scheduled cell can be referred to as 'SCG_Cell' and 'SCD_Cell', respectively.

Embodiment indexes for indicating following embodiments are designed to help user understand the present invention. Embodiments having a different index can be combined with each other and the scope of the present invention is not restricted by the order of the embodiment indexes.

Embodiment 1

A method for a UE in eIMTA FB_MODE to efficiently use a resource in UCell RRP is proposed in CA situation between TDD eIMTA PCell and UCell according to one embodiment of the present invention. For example, the TDD eIMTA Pcell corresponds to a SCG_cell and the UCell may correspond to a SCD_cell. According to the present embodiment, the eIMTA FB_MODE UE can efficiently utilize a DL SF of the UCell RRP that timing of the DL SF is identical to that of UL SF of the eIMTA PCell or a part of the DL SF is overlapped with the DL SF of the eIMTA PCell. In this case, the overlapped time duration can be defined in advance or may exceed a signaled permission area.

As an example, in the aspect of the eIMTA FB_MODE UE, the UL SF of the TDD eIMTA PCell may correspond to a UL SF indicated by UL-DL configuration of SIB1. In general, more UL SFs are set to the UL-DL configuration of SIB1 compared to a DL-HARQ reference configuration.

For clarity, the DL SF of the UCell RRP positioned at timing corresponding to the UL SF of the TDD eIMTA PCell (i.e., CCS-related SCG_cell of the UCell) is referred to as 'PU_UD SF'. And, a DL SF of the UCell RRP positioned at timing corresponding to a DL SF of the TDD eIMTA PCell (i.e., CCS-related SCG_cell of the UCell) is referred to as 'PD_UD SF'. The PD_UD SF can include a DL SF of the UCell RRP overlapped with DL SF timing of the TDD eIMTA PCell (e.g., overlapped less than a predefined area or a signaled permission area).

For reference, according to a legacy CSS operation, the PU_UD SF is unable to be used for transmitting DL data. For example, if PCell is configured by UL subframe, since it is unable to receive PDCCH for scheduling SCell in the UL subframe of the PCell, a UE assumes that PDSCH is not transmitted in the PU_UD SF according to the legacy scheme. Hence, in the legacy scheme, the UE is configured not to perform blind decoding, which is performed to detect the PDCCH for scheduling the SCell, in the UL subframe of the PCell.

According to one embodiment of the present invention, the eIMTA FB_MODE UE can be configured to perform blind decoding (BD) for detecting scheduling information on the UCell in a UL SF (i.e., flexible UL SF) on the SIB1 UL-DL configuration rather than a UL SF (i.e., semi-static UL SF) on DL-HARQ reference configuration of the TDD eIMTA Pcell (i.e., CCS-related SCG_cell of the UCell). The UL SF of the PCell on which the blind decoding of the UE is performed to detect the scheduling information on the UCell is referred to as 'V_DLSF (virtual_downlink subframe)'. The blind decoding of the UE assumes the V_DLSF as a virtual DL SF. In this case, as an example, there is possibility that the V_DLSF is configured as a UL SF according to the fallback mode and is configured as a DL SF according to reconfiguration DCI. Hence, in order to efficiently receive PDSCH, the UE can perform BD on the scheduling information in the V_DLSF.

As an example, it may be able to configure the BD to be performed only when PUSCH (re)transmission (e.g., based on UL grant or PHICH), aperiodic SRS transmission and/or simultaneous transmission of PUSCH and periodic SRS are not scheduled or triggered. In this case, as an example, if UL signal/data transmission is scheduled in the V_DLSF, the UE is able to assume that a base station does not schedule DL transmission or DL scheduling in the V_DLSF.

Embodiment 2

According to a different embodiment of the present invention, in CA environment in which RRP-based UCell is included, when UCI information (e.g., HARQ-ACK, CQI, PMI, and/or RI) is piggy backed to PUSCH which is transmitted in a UL SF of UCell RRP, a method of efficiently configuring MCS offset of the piggybacked UCI information is proposed. For clarity, the UCI information piggy backed to the PUSCH is referred to as 'PG_UCI'.

Tables 10 and 11 and FIG. 16 show a method of configuring MCS offset of PG_UCI defined in LTE. More specifically, FIG. 16 shows PUSCH configuration information element of RRC layer. 'PUSCH-ConfigCommon' included in the PUSCH configuration information element indicates a cell-common PUSCH configuration and an RS configuration for PUSCH/PUCCH and 'PUSCH-ConfigDedicated' indicates a UE-specific pUsCH configuration. Table 11 corresponds to description for each field of the PUSCH configuration information element shown in FIG. 16.

TABLE 10

CONTROL INFORMATION MCS OFFSET DETERMINATION

Offset values are defined for single codeword PUSCH transmission and multiple codeword PUSCH transmission. Single codeword PUSCH transmission offsets $\beta_{offset}^{HARQ-ACK}$, $\beta_{offset}^{RI}$ and $\beta_{offset}^{CQI}$ shall be configured to values according to Table 8.6.3-1, 2, 3 with the higher layer signalled indexes $I_{offset}^{HARQ-ACK}$, $I_{offset}^{RI}$, and $I_{offset}^{CQI}$, respectively. Multiple codeword PUSCH transmission offsets $\beta_{offset}^{HARQ-ACK}$, $\beta_{offset}^{RI}$, and $\beta_{offset}^{CQI}$ shall be configured to values according to Table 8.6.3-1, 2, 3 with the higher TABLE 10-continued

CONTROL INFORMATION MCS OFFSET DETERMINATION layer signalled indexes $I_{offset,\,MC}^{HARQ-ACK}$, $I_{offset,\,MC}^{RI}$ and $I_{offset,\,MC}^{CQI}$, respectively.
If the UE is configured with higher layer parameter UplinkPowerControlDedicated - v 12 x 0
  for serving cell c, and if a subframe belongs to uplink power control subframe set 2 as indicated
  by the higher layer parameter tpc-SubframeSet-r12, then for that subframe, the UE shall use
    the higher layer indexes $I_{offset,\,set2}^{HARQ-ACK}$, $I_{offset,\,set2}^{RI}$ and $I_{offset,\,set2}^{CQI}$ in place of $I_{offset}^{HARQ-ACK}$, $I_{offset}^{RI}$,
    and $I_{offset}^{CQI}$ respectively in Tables 8.6.3-1, 2, 3, to determine $\beta_{offset}^{HARQ-ACK}$, $\beta_{offset}^{RI}$ and $\beta_{offset}^{RI}$
    respectively for single codeword PUSCH transmissions, and
    the higher layer indexes $I_{offset,\,MC,\,set2}^{HARQ-ACK}$, $I_{offset,\,MC,\,set2}^{RI}$ and $I_{offset,\,MC,\,set2}^{CQI}$ in place of
    $I_{offset,\,MC}^{HARQ-ACK}$, $I_{offset,\,MC}^{RI}$ and $I_{offset,\,MC}^{CQI}$ respectively in Tables 8.6.3-1, 2, 3, to determine
    $\beta_{offset}^{HARQ-ACK}$, $\beta_{offset}^{RI}$ and $\beta_{offset}^{CQI}$ respectively for multiple codeword PUSCH transmissions.

TABLE 11

PUSCH-Config field descriptions betaOffset-ACK-Index, betaOffset-ACK-Index-MC
Parameter: $I_{offset}^{HARQ-ACK}$, for single- and multiple-codeword respectively, see TS
36.213 [23, Table 8.6.3-1]. One value applies for all serving cells with an uplink and not
configured with uplink power control subframe sets , and the same value applies for subframe
set 1 of all serving cells with an uplink and configured with uplink power control subframe
sets (the associated functionality is common i.e. not performed independently for each cell).
betaOffset-ACK-Index-SubframeSet2, betaOffset-ACK-Index-MC-SubframeSet2
Parameter: $I_{offset}^{HARQ-ACK}$, for single- and multiple-codeword respectively, see TS 36.213
[23, Table 86.3-1]. One value applies for subframe set 2 of all serving cells with an uplink
and configured with uplink power control subframe sets (the associated functionality is common
i.e. not performed independently for each cell configured with uplink power control subframe sets).
betaOffset-CQI-Index, betaOffset-CQI-Index-MC
Parameter: $I_{offset}^{CQI}$, for single- and multiple-codeword respectively, see TS 36.213 [23, Table
8.6.3-3]. One value applies for all serving cells with an uplink and not configured with uplink power
control subframe sets, and the same value applies for subframe set 1 of all serving cells with an uplink
and configured with uplink power control subframe sets (the associated functionality is common i.e.
not performed independenlly for each cell).
betaOffset-CQI-Index-SubframeSet2, betaOffset-CQI-Index-MC-SubframeSet2
Parameter: $I_{offset}^{CQI}$ for single- and multiple-codeword respectively, see TS 36.213 [23, Table
8.6.3-3]. One value applies for subframe set 2 of all serving cells with an uplink and configured with
uplink power control subframe sets (the associated functionality is common i.e. not performed
independently for each cell configured with uplink power control subframe sets).
betaOffset-RI-Index, betaOffset-RI-Index-MC
Parameter: $I_{offset}^{RI}$, for single- and multiple-codeword respectively, see TS 36.213 [23, Table
8.6.3-2]. One value applies for all serving cells with an uplink and not configured with uplink
power control subframe sets, and the same value applies for subframe set 1 of all serving cells
with an uplink and configured with uplink power control subframe sets (the associated functionality
is common i.e. not performed independently for each cell).
betaOffset-RI-Index-SubframeSet2, betaOffset-RI-Index-MC-SubframeSet2
Parameter: $I_{offset}^{RI}$, for single- and multiple-codeword respectively, see TS 36.213 [23,
Table 8.6.3-2]. One value applies for subframe set 2 of all serving cells with an uplink and
configured with uplink power control subframe sets (the associated functionality is common i.e.
not performed independently for each cell configured with uplink power control subframe sets).
cyclicShift
Parameters: cyclicShift, see TS 36.211 [21, Table 5.5.2.1.1-2].
dmrs-WithOCC-Activated
Parameter: Activate-DMRS-with OCC, see TS 36.211 [21, 5.5.2.1].
enable64QAM
See TS 36.213 [23, 8.6.1]. TRUE indicates that 64QAM is allowed while
FALSE indicates that 64QAM is not allowed.
groupAssignmentPUSCH
Parameter: ΔSS See TS 36.211 [21, 5.5.1.3].
groupHoppingDisabled
Parameter: Disable-sequence-group-hopping, see TS 36.211 [21, 5.5.1.3].
groupHoppingEnabled
Parameter: Group-hopping-enabled, see TS 36.211 [21, 5.5.1.3]
PUSCH-Config field descriptions hoppingMode
Parameter: Hopping-mode, see TS 36.211 [21, 5.3.4].
nDMRS-CSH-Identity
Parameter: $N_{ID}^{csh\ DMRS}$, see TS 36.211 [21, 5.5.2.1.1].
nPUSCH-Identity
Parameter: $n_{ID}^{PUSCH}$, see TS 36.211 [21, 5.5.1.5].
n-SB
Parameter: $N_{sb}$, see TS 36.211 [21, 5.3.4].
pusch-hoppingOffset
Parameter: $N_{RB}^{HO}$, see TS 36.211 [21, 5.3.4].
sequenceHoppingEnabled
Parameter: Sequence-hopping-enabled, see TS 36.211 [21, 5.5.1.4].

TABLE 11-continued ul- ReferenceSignalsPUSCH
Used to specify parameters needed for the transmission on PUSCH (or PUCCH).

Referring to Table 10, according to a legacy scheme, the MCS offset for the PG_UCI is commonly applied to all serving cells configured via CA. According to the legacy scheme, all serving cells are positioned at a licensed band.

Yet, when a cell of an unlicensed band and a cell of a licensed band are configured via CA, if the same MCS offset is commonly applied to the cell of the unlicensed band and the cell of the licensed band, it may cause inefficiency. For example, unlike a licensed band used by homogeneous systems, since an unlicensed band is used by heterogeneous systems, a different interference characteristic may occur on the unlicensed band.

According to one embodiment of the present invention, if cells (hereinafter, 'Lcell') on a licensed band and Ucells on an unlicensed band are used via CA, it may be able to signal MCS offset for PG_UCI applied to the UCells. The MCS offset for PG_UCI applied to the UCells can be configured and signaled irrespective of MCS offset for PG_UCI commonly applied to the LCells.

Meanwhile, if two UL power control sets or subframe-dependent UL power control is applied to at least a part of the UCells or at least a part of the LCells, it may be able to independently signal PG_UCI MCS offset according to each UL power control set or subframe-dependent UL poser control.

Embodiment 3

According to one embodiment of the present invention, in CA environment of the Lcell and the UCell, if there is an index gap between an Lcell SF and an UCell SF, a method of performing data transmission and reception in consideration of the index gap is proposed Timing of the LCell SF and timing of the UCell SF can be matched with each other. Or, a timing difference between the LCell SF and the UCell SF can be less than a threshold.

If the Ucell is scheduled by a different cell (e.g., LCell), it may assume that PDSCH associated with a DL grant for the UCell, which is received in a DL SF index #k, is received in a UCell DL SF index #(k+gap). For example, it may assume that the UCell DL SF index #(k+gap) corresponds to a DL SF in UCell RRP.

And, transmission timing of ACK/NACK, which is transmitted in response to the PDSCH received in the UCell DL SF index #(k+gap), can be configured on the basis of the LCell DL SF index #k in which the DL grant is received. For example, the ACK/NACK for the PDSCH of the UCell can be transmitted in LCell UL SF index #(k+D1). The D1 may correspond to a value configured by a predefined HARQ timeline.

If the Ucell is scheduled by a different cell (e.g., LCell), PUSCH/retransmission PUSCH related to the UL grant/PHICH of the UCell, which is received in the LCell DL SF index #k, can be transmitted in a UCell UL SF index #(k+gap+U1). The U1 may correspond to a value configured by a predefined DL HARQ timeline. For example, it may assume that the UCell UL SF index #(k+gap+U1) corresponds to a UL SF in UCell RRP.

Timing of the PHICH for the PUSCH, which is transmitted or retransmitted in the UCell UL SF index #(k+gap+U1), can be configured on the basis of the LCell DL SF index #k in which the UL grant/PHICH is received. For example, the PHICH can be received in LCell DL SF index #(k+U1+U2). The U2 may correspond to a value configured by a predefined DL HARQ timeline.

If a periodic/aperiodic CSI measurement result for the UCell is transmitted in the LCell UL SF index #k, a CSI reference resource (e.g., CSI-RS) of the UCell used for measuring the CSI can be received in UCell DL SF index #(k+gap-C1). The C1 may correspond to a value configured by a predefined CSI reference resource timeline. For example, it may assume that the UCell DL SF index #(k+gap-C1) corresponds to a DL SF in UCell RRP.

And, when DCI received in the LCell DL SF index #k triggers an aperiodic SRS of the UCell, the aperiodic SRS can be transmitted in UCell UL SF index #(k+gap+S1). The S1 may correspond to a value configured by a predefined aperiodic SRS transmission timeline. For example, it may assume that the UCell UL SF index #(k+gap+S1) corresponds to a UL SF in UCell RRP.

According to the aforementioned embodiments, since a position of LCell SF index is the same in time domain or timing difference is smaller than a threshold, the LCell SF index is assumed as the same position. Hence, an index gap between LCell SF and UCell SF is calculated on the basis of the LCell SF index. UL/DL data transmission/reception timeline, DL/UL HARQ timeline, aperiodic/periodic CSI reference resource timeline, and aperiodic SRS transmission timeline can be determined in consideration of the calculated index gap.

Meanwhile, the index gap can be signaled to a UE using a predefined scheme after the index gap is calculated by a cell or an eNB.

FIG. 17 is a flowchart for a method of transmitting and receiving a signal according to one embodiment of the present invention. FIG. 17 corresponds to an example only for helping the understanding of the aforementioned embodiments. The scope of right of the present invention according to the aforementioned embodiments is not restricted by FIG. 17. Explanation on contents overlapped with the aforementioned embodiments can be omitted.

Referring to FIG. 17, a UE obtains system information broadcasted by a base station [S1705]. The obtained system information can include SIB (system information block)-1. In case of a TDD system, the SIB-1 includes UL-DL configuration indicating a TDD subframe configuration. For clarity, assume that the SIB-1 is obtained prior to RRC configuration/reconfiguration. Yet, the SIB-1 can be updated in the middle of RRC configuration/reconfiguration or after the RRC configuration/reconfiguration.

The UE receives an RRC connection configuration message by requesting RRC connection to the base station [S1710]. RRC connection to a first cell positioned at a licensed band is established according to the RRC connection configuration message. In the present embodiment, assume that the first cell has a TDD frame structure. For example, assume that the first cell has a 3GPP LTE frame structure type 2.

Subsequently, the UE receives an RRC connection reconfiguration message from the base station [S1720]. The RRC connection reconfiguration message can include information indicating to additionally set at least one second cell to the previously set first cell. The first cell and the second cell can operate in a manner of being CA. The first cell operates as a Pcell and the second cell can operate as a Scell. If CCS is applied, the second cell is scheduled via the first cell.

Meanwhile, at least one of the second cells may be positioned at an unlicensed band. For example, the second cell may correspond to a cell of an unlicensed band capable of being used in an RRP (reserved resource period) only reserved via carrier sensing. The second cell may have a TDD frame structure or a FDD frame structure.

According to one embodiment, the base station can secure the RRP by performing carrier sensing. According to a different embodiment, the UE or a third party node can perform carrier sensing and may be then able to report a result of the carrier sensing to the base station. Although it is depicted as the carrier sensing is performed before the second cell is configured for clarity, by which the present invention may be non-limited. The carrier sensing can also be periodically or aperiodically performed after the second cell is configured.

Meanwhile, the base station can dynamically change a TDD subframe configuration, i.e., UL-DL configuration, via physical layer to avoid or reduce interference (eIMTA). For example, the base station can transmit downlink control information for UL-DL reconfiguration via (e)PDCCH [S1725].

In the present embodiment, assume that the UE fails to obtain a valid UL-DL reconfiguration DCI. For example, the UE may fail to detect DCI or decode DCI. Hence, the UE operates in eIMTA fallback mode [S1730].

In the eIMTA fallback mode, the UE can perform blind decoding by assuming a first uplink subframe of the first cell as a virtual downlink subframe according to a prescribed condition [S1730].

The first uplink subframe may correspond to one of uplink subframes indicated by a first uplink-downlink subframe configuration (e.g., SIB 1 UL_DL configuration) for the eIMTA fallback. The first uplink-downlink subframe configuration can be configured in advance via the SIB-1. Meanwhile, among the uplink subframes indicated by the first uplink-downlink subframe configuration, an uplink subframe indicated by a downlink HARQ (hybrid automatic repeat request) reference configuration for eIMTA fallback can be excluded from the first uplink subframes. In this case, the first uplink subframe is indicated as an uplink subframe by the SIB 1 UL_DL configuration used in the eIMTA fallback, whereas the first uplink subframe may correspond to a subframe indicated as a downlink subframe by DL HARQ reference configuration used in eIMTA fallback.

The downlink HARQ reference configuration for the eIMTA fallback can be obtained via the RRC connection configuration message or the RRC connection reconfiguration message.

A prescribed condition for assuming the first uplink subframe as a virtual downlink subframe may include failing to obtain downlink control information for dynamically reconfiguring second uplink-downlink subframe configuration set to the UE. And, the prescribed condition for assuming the first uplink subframe as a virtual downlink subframe may include not scheduling an uplink signal in the first uplink subframe, e.g., not scheduling transmission of PUSCH (physical uplink shared channel) or an SRS (sounding reference signal).

For example, according to the UL-DL reconfiguration DCI, which is failed to be received by the UE, it is probable that a position of the first uplink subframe is reconfigured as a downlink subframe. If the position of the first uplink subframe is reconfigured as the downlink subframe, the reconfigured downlink subframe can include control information for performing CCS on the second cell. If the UE considers the first uplink subframe as a general uplink subframe without performing blind decoding on the first uplink subframe, a radio resource of the second cell capable of being used for the RRP only can be wasted. Hence, the UE assumes the first uplink subframe as a virtual downlink subframe and attempts to perform blinding decoding on the first uplink subframe.

If a downlink grant for the second cell is detected by the blind decoding, the UE can receive downlink data via a second subframe of the second cell.

Assume that the first subframe of the first cell used for transmitting the downlink grant of the second cell and the second subframe of the second cell used for transmitting downlink data have a timing difference capable of being regarded as time aligned. Yet, although the first subframe and the second subframe are time-aligned, an index of the first subframe may differ from an index of the second subframe. For example, since there may exist an index gap between the index of the first subframe and the index of the second subframe, the UE and the base station can transmit and receive uplink-downlink signal in consideration of the index gap for the CA between the first cell and the second cell.

The UE transmits uplink control information to the base station [S1740]. The uplink control information can be transmitted via the first cell or the second cell. The uplink control information can include at least one of a CSI measurement result (e.g., RI, PMI, CQI) of the first cell or the second cell and ACK/NACK information on the first cell or the second cell.

For example, the UE can transmit ACK/NACK in response to downlink data in consideration of an index difference between a first subframe of the first cell and a second subframe of the second cell in which downlink data is received.

For example, the UE can transmit uplink control information piggy backed from the first cell via the second cell. It may apply MCS (modulation and coding scheme) information different from that of the first cell to the piggy backed uplink control information.

Figure 18:
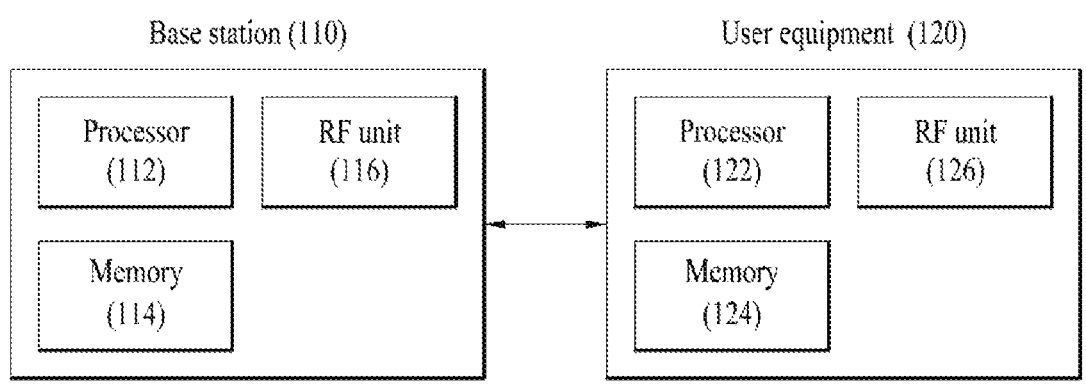
FIG. 18 illustrates a base station and a user equipment applicable to one embodiment of the present invention.

In the foregoing description, for clarity, it is depicted as the first cell and the second cell belong to the same base station. Yet, the first cell and the second cell may belong to base stations or transmission points different from each other FIG. 18 illustrates a base station and a user equipment applicable to one embodiment of the present invention. The base station and the UE shown in FIG. 18 can perform methods according to the aforementioned embodiments.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 18, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention can be applied to various wireless communication systems including 3GPP LTE system.

What is claimed is:

1. A method of receiving a signal by a user equipment (UE) configured with a plurality of cells, the method comprising:
    receiving a first uplink-downlink subframe configuration for enhanced interface mitigation and traffic adaptation (eIMTA) fallback, contained in a system information block type 1 (SIB 1), indicating that a first uplink subframe is a subframe which corresponds to one of uplink subframes;
    receiving a hybrid automatic repeat request (HARQ) reference configuration for the eIMTA fallback indicating that the first uplink subframe is a subframe which corresponds to one of downlink subframes;
    performing blind decoding on a downlink grant by assuming a first uplink subframe of a first cell with a time division duplex (TDD) frame structure among the plurality of cells as a virtual downlink subframe; and
    receiving downlink data via a second cell, residing on an unlicensed band, among a plurality of the cells, when the downlink grant for the second cell is detected during the blind decoding.

2. The method of claim 1, wherein the UE fails to obtain downlink control information for dynamically reconfiguring a second uplink-downlink subframe configuration.

3. The method of claim 1, wherein a physical uplink shared channel (PUSCH) transmission or a sounding reference signal (SRS) transmission is not scheduled in the first uplink subframe.

4. The method of claim 1, wherein the second cell is available only in a resource period reserved through carrier sensing.

5. The method of claim 1, further comprising:
    transmitting, via the second cell, uplink control information piggy backed from the first cell,
    wherein modulation and coding scheme (MCS) information different from MCS information of the first cell is applied to the piggy backed uplink control information.

6. A user equipment (UE) configured with a plurality of cells in a wireless communication system, the UE comprising:
    a receiver;
    a transmitter; and
    a processor, operably coupled to the receiver and the transmitter, wherein the processor is configured to:
    receive a first uplink-downlink subframe configuration for enhanced interface mitigation and traffic adaptation (eIMTA) fallback, contained in a system information block type 1 (SIB 1), indicating that a first uplink subframe is a subframe which corresponds to one of uplink subframes;
    receive a hybrid automatic repeat request (HARQ) reference configuration for the eIMTA fallback indicating that the first uplink subframe is a subframe which corresponds to one of downlink subframes;
    perform blind decoding on a downlink grant for a second cell by assuming a first uplink subframe of a first cell with a time division duplex (TDD) frame structure among the plurality of cells as a virtual downlink subframe; and control the receiver to receive downlink data via the second cell, residing in an unlicensed band, among a plurality of the cells configured in the UE, when the downlink grant for the second cell is detected during the blind decoding.

7. The UE of claim 6, wherein the processor fails to obtain downlink control information for dynamically reconfiguring a second uplink-downlink subframe configuration.

8. The UE of claim 6, wherein a physical uplink shared channel (PUSCH) transmission or a sounding reference signal (SRS) transmission is not scheduled in the first uplink subframe.

9. The UE of claim 6, wherein the second cell is available only in a resource period reserved through carrier sensing.

10. The UE of claim 6,
wherein the processor is further configured to:
control the transmitter to transmit, via the second cell, uplink control information piggy backed from the first cell,
wherein modulation and coding scheme (MCS) information different from MCS information of the first cell is applied to the piggy backed uplink control information.

* * * * *